US012684478B2

(12) United States Patent
Sun et al.

(10) Patent No.: US 12,684,478 B2
(45) Date of Patent: Jul. 14, 2026

(54) METHOD AND APPARATUS FOR OPERATING LOW-POWER WAKE-UP RECEIVER (LP-WUR)

(71) Applicant: Apple Inc., Cupertino, CA (US)

(72) Inventors: Haitong Sun, Cupertino, CA (US); Dawei Zhang, Saratoga, CA (US); Wei Zeng, Saratoga, CA (US); Sigen Ye, San Diego, CA (US); Yang Tang, San Jose, CA (US); Ankit Bhamri, Bad Nauheim (DE)

(73) Assignee: Apple Inc., Cupertino, CA (US)

( * ) Notice: Subject to any disclaimer, the term of this patent is extended or adjusted under 35 U.S.C. 154(b) by 302 days.

(21) Appl. No.: 18/620,266

(22) Filed: Mar. 28, 2024

(65) Prior Publication Data

US 2024/0381249 A1     Nov. 14, 2024

Related U.S. Application Data

(60) Provisional application No. 63/465,317, filed on May 10, 2023.

(51) Int. Cl.
*H04W 52/02*          (2009.01)
(52) U.S. Cl.
CPC ... *H04W 52/0216* (2013.01); *H04W 52/0235* (2013.01)
(58) Field of Classification Search
None
See application file for complete search history.

(56) References Cited

U.S. PATENT DOCUMENTS

| | | | |
|---|---|---|---|
| 2018/0255515 A1 | 9/2018 | Hyde et al. | |
| 2020/0404617 A1* | 12/2020 | Murray | H04W 52/0229 |
| 2021/0119742 A1* | 4/2021 | Wu | H04W 72/046 |
| 2021/0168720 A1 | 6/2021 | Park et al. | |
| 2022/0346009 A1 | 10/2022 | Song et al. | |
| 2023/0328841 A1 | 10/2023 | Ganesan | |
| 2024/0155499 A1 | 5/2024 | Sun | |
| 2024/0284329 A1 | 8/2024 | Elshafie | |
| 2024/0284330 A1 | 8/2024 | Paris | |
| 2026/0006552 A1 | 1/2026 | Wei | |

FOREIGN PATENT DOCUMENTS

WO     WO-2018182312 A1 * 10/2018     ........... H04W 84/12

OTHER PUBLICATIONS

Translation of WO-2018182312-A1 (Year: 2018).*

(Continued)

*Primary Examiner* — Robert M Morlan
(74) *Attorney, Agent, or Firm* — Sterne, Kessler, Goldstein & Fox P.L.L.C.

(57)          ABSTRACT

Some aspects of this disclosure relate to apparatuses and methods for implementing one or more low-power wake-up receivers (LP-WUR) at the UE and for implementing mechanisms for improving receiver sensitivity loss for the LP-WUR. According to some aspects, apparatuses and methods are provided to improve the receiver sensitivity loss for the LP-WUR using time domain coverage improvement, power domain coverage improvement, spatial domain coverage improvement, and/or frequency domain coverage improvement.

20 Claims, 11 Drawing Sheets

(56)                         References Cited

OTHER PUBLICATIONS

International Search Report and Written Opinion directed to International Application No. PCT/US2024/027700, mailed Dec. 2, 2024; 14 pages.

Invitation to Pay Fees and Communication Relating to the Results of the Partial International Search directed to International Application No. PCT/US2024/027700, mailed Oct. 9, 2024; 13 pages.

3GPP TS 38.211 version 16.2.0 Release 16, "Physical channels and modulation" ETSI, Jul. 2020, 136 pages.

3GPP TS 38.213 version 17.1.0 Release 17, "Physical layer procedures for control" ETSI, May 2022, 247 pages.

International Search Report and Written Opinion directed to International Application No. PCT/US2024/027696, mailed Sep. 27, 2024; 9 pages.

U.S. Appl. No. 18/620,295, "Method and Apparatus for Operating Low-Power Wake-Up Receiver (LP-WUR)", to Haitong Sun, filed Mar. 28, 2024.

* cited by examiner

301

303

305

307

LP-WUS
Part 1

LP-WUS
Part 2

LP-WUS
Part 3

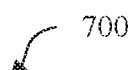

700

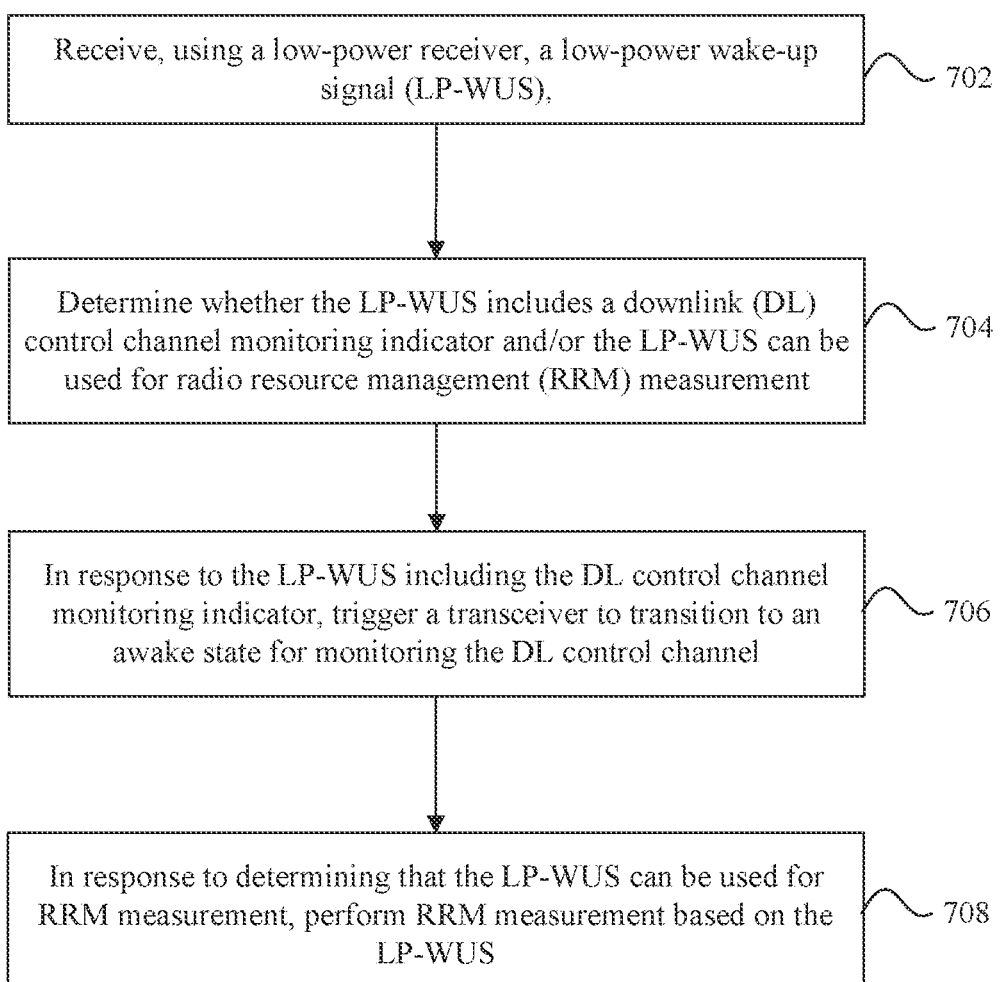

Receive, using a low-power receiver, a low-power wake-up signal (LP-WUS), ~ 702

Determine whether the LP-WUS includes a downlink (DL) control channel monitoring indicator and/or the LP-WUS can be used for radio resource management (RRM) measurement ~ 704

In response to the LP-WUS including the DL control channel monitoring indicator, trigger a transceiver to transition to an awake state for monitoring the DL control channel ~ 706

In response to determining that the LP-WUS can be used for RRM measurement, perform RRM measurement based on the LP-WUS ~ 708

FIG. 7

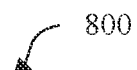
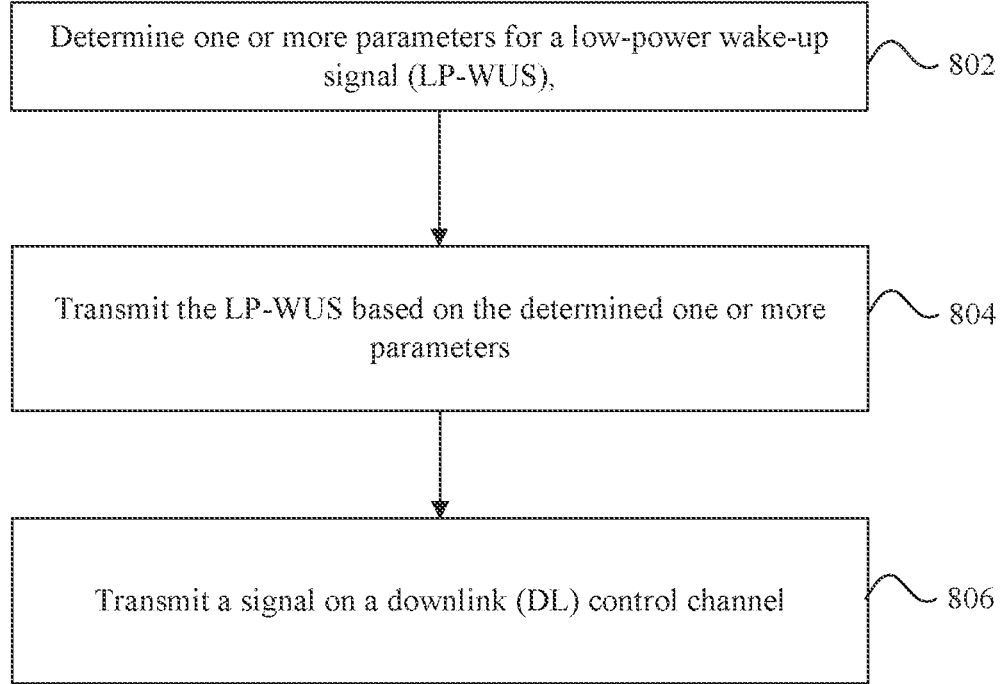
Determine one or more parameters for a low-power wake-up signal (LP-WUS),                    ~ 802
Transmit the LP-WUS based on the determined one or more parameters                    ~ 804
Transmit a signal on a downlink (DL) control channel                    ~ 806
FIG. 8

METHOD AND APPARATUS FOR OPERATING LOW-POWER WAKE-UP RECEIVER (LP-WUR)

CROSS-REFERENCE TO RELATED APPLICATIONS

The present application claims the benefit of U.S. Provisional Patent Application No. 63/465,317, filed on May 10, 2023, which is incorporated by reference herein in its entirety.

BACKGROUND

Field

The described aspects generally relate to mechanisms for using a low-power wake-up signal (LP-WUS) and for operating a low-power wake-up receiver (LP-WUR).

Related Art

A user equipment (UE) can use its transceiver (e.g., its main radio) for monitoring downlink (DL) control channels such as a Physical Downlink Control Channel (PDCCH). Similarly, the UE can use its transceiver (e.g., its main radio) for radio resource management (RRM). In order to monitor the DL control channels, the UE has to periodically transition its transceiver to an awake state even if no DL control information is transmitted on the DL control channels. Similarly, for the RRM, the UE has to periodically transition its transceiver to the awake state for RRM measurement. The transitioning of the transceiver to the awake state can increase the power consumption of the UE and negatively impact the UE's battery.

SUMMARY

Some aspects of this disclosure relate to apparatuses and methods for implementing one or more low-power wake-up receivers (LP-WUR) at the UE and for implementing mechanisms for improving receiver sensitivity loss for the LP-WUR. According to some aspects, apparatuses and methods are provided to improve the receiver sensitivity loss for the LP-WUR using time domain coverage improvement, power domain coverage improvement, spatial domain coverage improvement, and/or frequency domain coverage improvement.

Some aspects of this disclosure relate to a user equipment (UE). The UE includes a transceiver configured to wirelessly communicate with a base station and a low-power receiver configured to wirelessly communicate with the base station. The UE further includes a processor communicatively coupled to the transceiver and the low-power receiver. The processor is configured to receive, using the low-power receiver, a low-power wake-up signal (LP-WUS). The LP-WUS includes a plurality of symbols aggregated in a time domain and the plurality of symbols include one symbol repeated in the time domain. The processor is further configured to determine whether the LP-WUS includes a downlink (DL) control channel monitoring indicator. In response to the LP-WUS including the DL control channel monitoring indicator, the processor is configured to trigger the transceiver to transition to an awake state for monitoring the DL control channel.

In some aspects, the plurality of symbols are aggregated in the time domain with their corresponding cyclic prefix. In some aspects, the plurality of symbols are aggregated in the time domain without their corresponding cyclic prefix. In some aspects, the plurality of symbols include a plurality of orthogonal frequency-division multiplexing (OFDM) symbols with a subcarrier spacing (SCS) smaller than 15 kHz, for example, 1.25 kHz, 5 kHz, 15/32 kHz. In some aspects, the plurality of symbols are different from orthogonal frequency-division multiplexing (OFDM) symbols.

In some aspects, the processor is further configured to detect that the LP-WUS is to be used for radio resource management (RRM) measurement and to perform the RRM measurement based on the LP-WUS. For example, the processor is configured to use the LP-WUS to perform the RRM measurement.

In some aspects, the processor is further configured to transmit, using the transceiver, a message to the base station indicating a desired transmission power boost for the LP-WUS and receive, using the low-power receiver, a second LP-WUS from the base station, the second LP-WUS having an increased transmission power relative to that of the LP-WUS and based on the desired transmission power boost for the LP-WUS.

In some aspects, the desired transmission power boost includes an absolute transmission power value, an absolute transmission power offset value, an absolute transmission power adjustment, or an accumulative transmission power adjustment.

In some aspects, a desired transmission power boost for the LP-WUS is indicated indirectly using an uplink (UL) transmission power control. In some aspects, the processor is further configured to receive the transmission power control for a UL transmission from the UE to the base station, where the UL transmission power control indicates a transmission power boost. In some aspects, the UL transmission power control includes a loss parameter associated with the transmission power boost.

In some aspects, the processor is configured to receive the LP-WUS using a plurality of spatial domain filters over a frequency domain resource or over a time domain resource. In some aspects, the plurality of spatial domain filters are explicitly configured by the base station or the plurality of spatial domain filters are implicitly configured by the base station.

Some aspects of this disclosure relate to a method performed by a user equipment (UE) including receiving, using a low-power receiver of the UE, a low-power wake-up signal (LP-WUS) from a base station. The LP-WUS include a plurality of symbols aggregated in a time domain and the plurality of symbols include one symbol repeated in the time domain. The method further includes determining whether the LP-WUS includes a downlink (DL) control channel monitoring indicator. In response to the LP-WUS comprising the DL control channel monitoring indicator, the method further includes triggering a transceiver of the UE to transition to an awake state for monitoring the DL control channel.

Some aspects of this disclosure relate to a non-transitory computer-readable medium storing instructions. When the instructions are executed by a processor of a user equipment (UE), the instructions cause the UE to perform operations including receiving, using a low-power receiver of the UE, a low-power wake-up signal (LP-WUS) from a base station. The LP-WUS include a plurality of symbols aggregated in a time domain and the plurality of symbols include one symbol repeated in the time domain. The operations further include determining whether the LP-WUS includes a downlink (DL) control channel monitoring indicator. In response to the LP-WUS comprising the DL control channel monitoring indicator, the operations further include triggering a transceiver of the UE to transition to an awake state for monitoring the DL control channel.

Some aspects of this disclosure relate to a user equipment (UE). The UE includes a transceiver configured to wirelessly communicate with a base station. The transceiver operates at a first frequency and a first bandwidth. The UE further includes a low-power receiver configured to wirelessly communicate with the base station. The low-power receiver operates at a second frequency and a second bandwidth. The second frequency is different from the first frequency and the second bandwidth is smaller than the first bandwidth. The UE further includes a processor communicatively coupled to the transceiver and the low-power receiver. The processor is configured to receive, using the low-power receiver, a low-power wake-up signal (LP-WUS) and determine whether the LP-WUS includes a downlink (DL) control channel monitoring indicator. The processor is further configured to trigger the transceiver to transition to an awake state for monitoring the DL control channel in response to the LP-WUS comprising the DL control channel monitoring indicator.

In some aspects, the second frequency is in a licensed band. In some aspects, the second frequency is in an unlicensed band. In some aspects, the second frequency is in a guard band associated with the first frequency and the first bandwidth.

In some aspects, the processor is further configured to receive, using the low-power receiver, a second LP-WUS, where the second LP-WUS is associated with a third frequency different from the first frequency and the second frequency. In some aspects, a time domain gap exists between the LP-WUS and the second LP-WUS. In some aspects, a duration of the time domain gap is set by the base station or is reported by the UE to the base station.

Some aspects of this disclosure relate to a method performed by a user equipment (UE) including receiving, using a low-power receiver of the UE, a low-power wake-up signal (LP-WUS) from a base station. The low-power receiver is configured to wirelessly communicate with the base station and operates at a first frequency and a first bandwidth. The first frequency is different from a second frequency associated with a transceiver of the UE, and the first bandwidth is smaller than a second bandwidth associated with the transceiver of the UE. The method further includes determining whether the LP-WUS includes a downlink (DL) control channel monitoring indicator and in response to the LP-WUS comprising the DL control channel monitoring indicator, triggering the transceiver to transition to an awake state for monitoring the DL control channel.

Some aspects of this disclosure relate to a non-transitory computer-readable medium storing instructions. When the instructions are executed by a processor of a user equipment (UE), the instructions cause the UE to perform operations including receiving, using a low-power receiver of the UE, a low-power wake-up signal (LP-WUS) from a base station. The low-power receiver is configured to wirelessly communicate with the base station and operates at a first frequency and a first bandwidth. The first frequency is different from a second frequency associated with a transceiver of the UE, and the first bandwidth is smaller than a second bandwidth associated with the transceiver of the UE. The operations further include determining whether the LP-WUS includes a downlink (DL) control channel monitoring indicator and in response to the LP-WUS comprising the DL control channel monitoring indicator, triggering the transceiver to transition to an awake state for monitoring the DL control channel.

This Summary is provided merely for purposes of illustrating some aspects to provide an understanding of the subject matter described herein. Accordingly, the above-described features are merely examples and should not be construed to narrow the scope or spirit of the subject matter in this disclosure. Other features, aspects, and advantages of this disclosure will become apparent from the following Detailed Description, Figures, and Claims.

BRIEF DESCRIPTION OF THE FIGURES

The accompanying drawings, which are incorporated herein and form part of the specification, illustrate the present disclosure and, together with the description, further serve to explain the principles of the disclosure and enable a person of skill in the relevant art(s) to make and use the disclosure.

FIG. 7 illustrates an example method for a system (for example, a UE) performing mechanisms for improving receiver sensitivity loss for the LP-WUR, according to some aspects of the disclosure.

FIG. 8 illustrates an example method for a system (for example, a base station) performing mechanisms for improving receiver sensitivity loss for the LP-WUR, according to some aspects of the disclosure.

Figure 1:
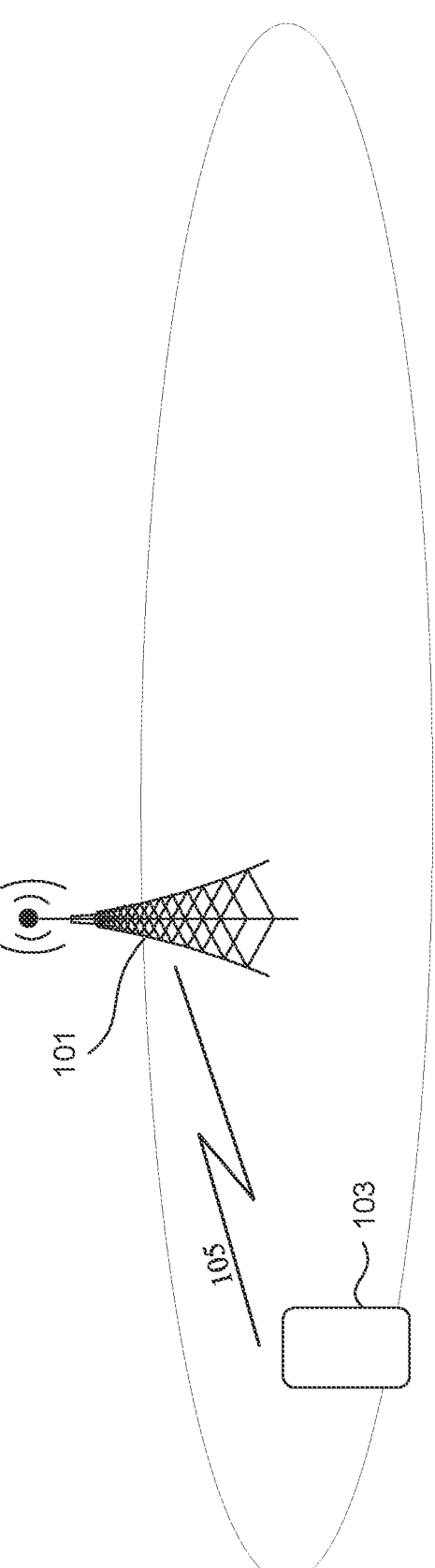
FIG. 1 illustrates an example system implementing mechanisms for improving receiver sensitivity loss for the LP-WUR, according to some aspects of the disclosure.

The present disclosure is described with reference to the accompanying drawings. In the drawings, generally, like reference numbers indicate identical or functionally similar elements. Additionally, generally, the left-most digit(s) of a reference number identifies the drawing in which the reference number first appears.

DETAILED DESCRIPTION

Some aspects of this disclosure relate to apparatuses and methods for implementing one or more low-power wake-up receivers (LP-WUR) at the UE and for implementing mechanisms for improving receiver sensitivity loss for the LP-WUR. According to some aspects, apparatuses and methods are provided to improve the receiver sensitivity loss for the LP-WUR using time domain coverage improvement, power domain coverage improvement, spatial domain coverage improvement, and/or frequency domain coverage improvement.

In some examples, the aspects of this disclosure can be performed by a network and/or a UE that operates according to 5$^{th}$ generation (5G) wireless technology for digital cellular networks as defined by 3rd Generation Partnership Project (3GPP). Additionally, or alternatively, the aspects of this disclosure can be performed by a network and/or a UE that operates according to the Release 15 (Rel-15), Release 16 (Rel-16), Release 17 (Rel-17), Rel-17 new radio (NR), Rel-18, Rel-18 NR or others. However, the aspects of this disclosure are not limited to these examples, and one or more mechanisms of this disclosure can be implemented by other network(s) and/or UE(s) for improving receiver sensitivity loss for the LP-WUR.

FIG. 1 illustrates an example system 100 implementing mechanisms for improving receiver sensitivity loss for the LP-WUR, according to some aspects of the disclosure. Example system 100 is provided for the purpose of illustration only and does not limit the disclosed aspects.

System 100 may include, but is not limited to, a network node (for example, a base station such as eNBs, gNBs, and the like) 101 and an electronic device (for example, a UE) 103. The electronic device 103 (hereinafter referred to as UE 103) can be configured to operate based on a wide variety of wireless communication techniques. These techniques can include, but are not limited to, techniques based on 3rd Generation Partnership Project (3GPP) standards. For example, the UE 103 can be configured to operate using Rel-15, Rel-16, Rel-17, Rel-17 NR, Rel-18, Rel-18 NR, or other. The UEs 103 can include, but is not limited to, wireless communication devices, smart phones, laptops, desktops, tablets, personal assistants, monitors, televisions, wearable devices, Internet of Things (IoTs), vehicle's communication devices, and the like. The network node 101 (herein referred to as a base station or a cell) can include one or more nodes configured to operate based on a wide variety of wireless communication techniques such as, but not limited to, techniques based on 3GPP standards. For example, the base station 101 can include one or more nodes configured to operate using Rel-15, Rel-16, Rel-17, Rel-17 NR, Rel-18, Rel-18 NR, or others.

According to some aspects, the UE 103 can be connected to and can communicate with the base station 101 using a carrier 105. According to some aspects, the carrier 105 can include one carrier. Additionally, or alternatively, the carrier 105 can include two or more component carriers (CC). In other words, the UE 103 can implement carrier aggregation (CA). For example, the UE 103 can use multiple carriers for communication with the base station 101.

According to some aspects, base station 101 and UE 103 are configured to implement one or more LP-WUR at the UE 103 and implement mechanisms for improving receiver sensitivity loss for the LP-WUR. As discussed in more detail below, the UE 103 can include one or more LP-WUR in addition to the UE 103 main transceiver (also referred to herein as the main radio). The LP-WUR of the UE 103 can be implemented as a separate device component independent of the UE 103 main transceiver to save the UE 103 power consumption related to downlink (DL) control channel (e.g., PDCCH) monitoring and RRM. According to some aspects, compared to the main transceiver of the UE 103, the LP-WUR of the UE 103 is expected to achieve LP-WUS monitoring/measurement with much less power than would be used by the main radio.

According to some aspects, the base station 101 can use the DL control channel for scheduling uplink and DL. However, the base station 101 can use the DL control channel for other purposes. According to some aspects, the RRM is used for mobility measurement. For example, as the UE 103 moves, the UE 103 can monitor and measure the call quality. If the cell quality for the current cell (e.g., base station 101) drops below a threshold, the UE 103 (and/or the base station 101) can initiate and perform a handover operation such that the UE 103 can connect to and communicate with a cell (e.g., another base station) with better cell quality.

According to some aspects, the UE 103 can use its LP-WUR to monitor for DL control channel monitoring indicator. Since, the DL control channel does not always include data and/or information, using the LP-WUR to monitor for DL control channel monitoring indicator can improve the UE 103 power consumption. By monitoring for the DL control channel monitoring indicator using the LP-WUR, the UE 103 can transition its main transceiver to awake state only when the UE 103 knows that the DL control channel has data and/or information based on the DL control channel monitoring indicator. Similarly, using the LP-WUR (instead of the main transceiver) for RRM measurement can improve UE 103 power consumption.

When the UE 103 is using its LP-WUR to achieve much lower power consumption compared to the UE 103 main transceiver, certain performance trade-off may be made. For example, the LP-WUR may have a worse receiver sensitivity (e.g., higher noise figure) compared to the UE 103 main transceiver. The receiver sensitivity can be the minimum power of the receiving signal at which the receiver (e.g., the LP-WUR) can reliably detect. In some examples, a high receiver sensitivity of a receiver can mean a worse receiver sensitivity where a higher transmission power is needed for the received signal so that the receiver can detect the signal. A low receiver sensitivity of the receiver can mean a better receiver sensitivity where a lower transmission power is needed for the received signal so that the receiver can detect the signal. In some aspects, the LP-WUR may be a digital receiver. In some aspects, the LP-WUR may be an analog receiver.

As discussed in more detail below, some aspects of this disclosure are directed to implementing mechanisms for improving the receiver sensitivity for the LP-WUR. According to some aspects, apparatuses and methods are provided to improve the receiver sensitivity for the LP-WUR using time domain coverage improvement, power domain coverage improvement, spatial domain coverage improvement, and/or frequency domain coverage improvement.

For example, to compensate for the receiver sensitivity loss for the LP-WUR of the UE 103, one or more of time domain coverage improvement, power domain coverage improvement, spatial domain coverage improvement, and/or frequency domain coverage improvement can be used. According to some aspects, the time domain coverage improvement can include using longer time domain duration for the LP-WUS. The longer time domain duration allows the LP-WUR of the UE 103 to accumulate more energy to combat the receiver sensitivity loss.

According to some aspects, the power domain coverage improvement can include the base station 101 using transmission power boosting for transmission of the LP-WUS. In some aspects, the UE 103 can report the desired transmission power boost to the base station 101. Additionally, or alternatively, the transmission power boost can be indicated indirectly as part of, for example, UL power control. According to some aspects, the spatial domain coverage improvement can include using selective spatial beam (digital or analog) cycling in frequency domain and/or time domain.

According to some aspects, the frequency domain coverage improvement can include using low frequency band. The low frequency band can improve radio propagation conditions (e.g., smaller path loss). The frequency domain coverage improvement can also include narrow band with frequency hopping. The narrow band can be used to reduce LP-WUR energy consumption and the frequency hopping can be used to increase frequency diversity.

Figure 2:
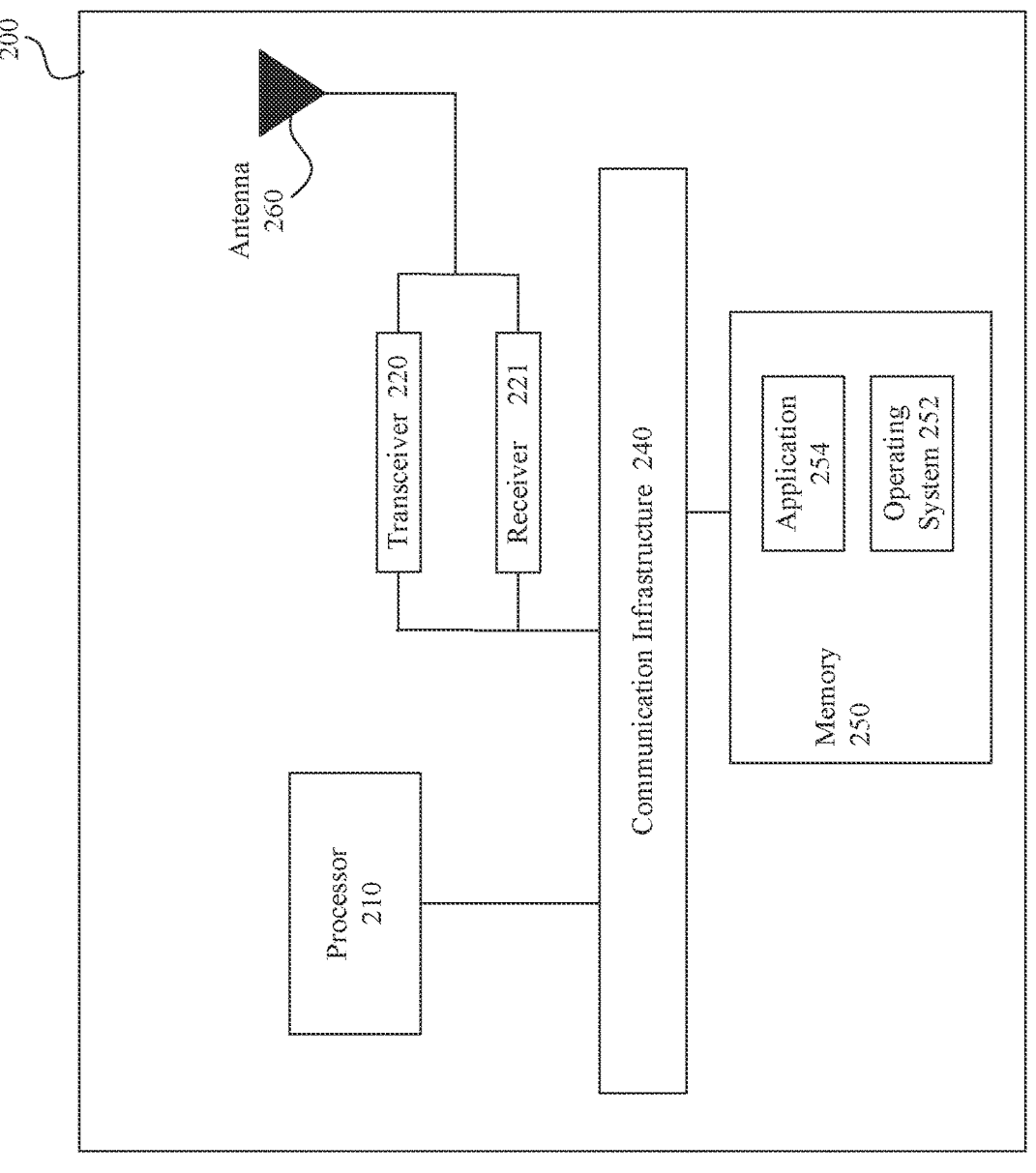
FIG. 2 illustrates a block diagram of an example system of an electronic device implementing one or more low-power wake-up receivers (LP-WUR) and implementing mechanisms for improving receiver sensitivity loss for the LP-WUR, according to some aspects of the disclosure.

FIG. 2 illustrates a block diagram of an example system 200 of an electronic device implementing one or more LP-WUR and implementing mechanisms for improving receiver sensitivity loss for the LP-WUR. System 200 may be any of the electronic devices (e.g., base station 101, UE 103) of system 100. System 200 includes a processor 210, one or more transceivers 220, one or more low-power receiver(s) 221, a communication infrastructure 240, a memory 250, operating system 252, application 254, and/or one or more antennas 260. Illustrated systems are provided as exemplary parts of system 200, and system 200 can include other circuit(s) and subsystem(s). Also, although the systems of system 200 are illustrated as separate components, the aspects of this disclosure can include any combination of these, less, or more components. Also, system 200 of the aspects of this disclosure can include any number of processors, transceivers, receivers, communication infrastructures, memories, operating systems, applications, and antennas.

The memory 250 may include random access memory (RAM) and/or cache, and may include control logic (e.g., computer software) and/or data. The memory 250 may include other storage devices or memory such as, but not limited to, a hard disk drive and/or a removable storage device/unit. According to some examples, the operating system 252 can be stored in the memory 250. The operating system 252 can manage transfer of data between the memory 250, the one or more applications 254, the processor 210, the one or more transceivers 220, and/or the one or more low-power receiver(s) 221. In some examples, the operating system 252 maintains one or more network protocol stacks (e.g., Internet protocol stack, cellular protocol stack, and the like) that can include a number of logical layers. At corresponding layers of the protocol stack, the operating system 252 includes control mechanism and data structures to perform the functions associated with that layer.

According to some examples, the application 254 can be stored in the memory 250. The application 254 can include applications (e.g., user applications) used by wireless system 200 and/or a user of wireless system 200. The applications in the application 254 can include applications such as, but not limited to, radio streaming, video streaming, remote control, and/or other user applications.

System 200 can also include the communication infrastructure 240. The communication infrastructure 240 provides communication between, for example, the processor 210, the one or more transceivers 220, the one or more low-power receiver(s) 221, and the memory 250. In some implementations, the communication infrastructure 240 may be a bus. The processor 210 together with instructions stored in memory 250 performs operations enabling system 200 of system 100 to implement mechanisms for improving receiver sensitivity loss for the LP-WUR, as described herein. Additionally, or alternatively, the one or more transceivers 220 and/or the one or more low-power receiver(s) 221 perform operations enabling the wireless system 200 of system 100 to implement mechanisms for improving receiver sensitivity loss for the LP-WUR, as described herein.

The one or more transceivers 220 transmit and receive communications signals that support the operations of system 200 including, but not limited to, mechanisms for improving receiver sensitivity loss for the LP-WUR, according to some aspects, and may be coupled to the one or more antennas 260. (Herein, transceivers can also be referred to as radios). The one or more low-power receiver(s) 221 can receive communications signals that support the one or more transceivers 220 and support the receiver sensitivity loss improvements for the LP-WUR, according to some aspects, and may be coupled to the one or more antennas 260.

The one or more antennas 260 may include one or more antennas that may be the same or different types. The one or more antennas 260 may include one or more MIMO antenna(s) having one or more antenna ports. According to some aspects, each antenna port of the one or more antennas 260 can carry its resource grid and one or more reference signals. The antenna ports of the one or more antennas 260 can be indicated using port numbers. Different antenna ports can be assigned to different channels and/or signals.

The one or more transceivers 220 and/or the one or more low-power receiver(s) 221 allow system 200 to communicate with other devices that may be wired and/or wireless. In some examples, the one or more transceivers 220 can include processors, controllers, radios, sockets, plugs, buffers, and like circuits/devices used for connecting to and communication on networks. According to some examples, the one or more transceivers 220 include one or more circuits to connect to and communicate on wired and/or wireless networks.

According to some aspects, the one or more transceivers 220 can include a cellular subsystem, a WLAN subsystem, and/or a Bluetooth™ subsystem, each including its own radio transceiver and protocol(s) as will be understood by those skilled arts based on the discussion provided herein. In some implementations, the one or more transceivers 220 can include more or fewer systems for communicating with other devices.

In some examples, the one or more transceivers 220 can include one or more circuits (including a WLAN transceiver) to enable connection(s) and communication over WLAN networks such as, but not limited to, networks based on standards described in IEEE 802.11. Additionally, or alternatively, the one or more transceivers 220 can include one or more circuits (including a Bluetooth™ transceiver) to enable connection(s) and communication based on, for example, Bluetooth™ protocol, the Bluetooth™ Low Energy protocol, or the Bluetooth™ Low Energy Long Range protocol. For example, transceiver 220n can include a Bluetooth™ transceiver.

Additionally, the one or more transceivers 220 can include one or more circuits (including a cellular transceiver) for connecting to and communicating on cellular networks. The cellular networks can include, but are not limited to, 3G/4G/5G networks such as Universal Mobile Telecommunications System (UMTS), Long-Term Evolution (LTE), and the like. For example, the one or more transceivers 220a-220n can be configured to operate according to one or more of Rel-15, Rel-16, Rel-17, Rel-17 NR, Rel-18, Rel-18 NR, or other of the 3GPP standards.

According to some aspects, the processor 210, alone or in combination with computer instructions stored within the memory 250, the one or more transceiver 220, and/or the one or more low-power receiver(s) 221, implements one or more LP-WUR and implements mechanisms for improving receiver sensitivity loss for the LP-WUR, as discussed herein.

According to some aspects, the one or more transceivers 220 can include the main transceiver (e.g., the main radio) of the UE (e.g., the UE 103). According to some aspects, the one or more low-power receiver(s) 221 can herein be referred to as the LP-WUR of the UE. The one or more low-power receivers 221 generally consume less power than the one or more transceiver 220, given the same signal input.

According to some aspects, the one or more low-power receiver(s) 221 can be a receive-only receiver, for example, a receive-only auxiliary radio. In a non-limiting example, the one or more low-power receiver(s) 221 can be a scan radio. In some examples, the one or more low-power receiver(s) 221 can be a low-power radio that can scan through each channel(s) of a frequency band/link. In another non-limiting example, the one or more low-power receiver(s) 221 can be a non-scanning radio used for non-scanning purposes. In one example, the system 200 can include one low-power receiver 221, which can scan channels in one or more frequency bands. Alternatively, the system 200 can include more than one low-power receiver 221, where each receiver can scan channels in a different frequency band from the other low-power receivers 221. In other examples, the one or more low-power receiver(s) 221 is an auxiliary radio that is a receiver only but can be turned into a transceiver by moving radio resource(s) from the transceiver 220 to the low-power receiver 221. However, these are provided as examples, and the aspects of this disclosure can include other number of receivers, frequency bands, and/or configurations. In some examples, the one or more low-power receiver(s) 221 can include processors, controllers, radios, sockets, plugs, buffers, and like circuits/devices.

Figure 3:
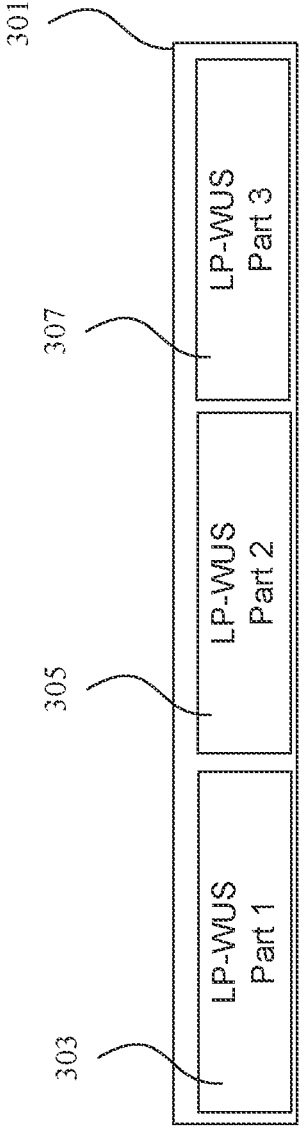
FIG. 3 illustrates an example LP-WUS, according to some aspects of the disclosure.

FIG. 3 illustrates an example LP-WUS 301, according to some aspects of the disclosure. As a convenience and not a limitation, FIG. 3 may be described with regard to elements of FIGS. 1-2.

According to some aspects, the base station (e.g., the base station 101 of FIG. 1) is configured to transmit a LP-WUS (e.g., the LP-WUS 301). The UE (e.g., the UE 103) is configured to receive the LP-WUS using the UE's LP-WUR (e.g., low-power receiver 221 of FIG. 2). After receiving the LP-WUS (using the LP-WUR), the UE can be configured to determine whether the LP-WUS includes a DL control channel monitoring indicator. If the LP-WUS include the DL control channel monitoring indicator, the UE can transition its main transceiver (e.g., transceiver 220 of FIG. 2) to an awake state so that the main transceiver can monitor the DL control channel (e.g., PDCCH). However, if the LP-WUS does not include the DL control channel monitoring indicator, the UE can maintain its main transceiver (e.g., transceiver 220 of FIG. 2) in an idle state and/or sleep state, therefore improve the UE's power consumption.

According to some aspects, the DL control channel monitoring indicator can include one bit. In some examples, if the DL control channel monitoring indicator is set to a first value (e.g., "1"), the UE can transition its main transceiver (e.g., transceiver 220 of FIG. 2) to an awake state so that the main transceiver can monitor the DL control channel (e.g., PDCCH). In the DL control channel monitoring indicator is set to a second value (e.g., "0"), the UE can maintain its main transceiver (e.g., transceiver 220 of FIG. 2) in an idle state and/or sleep state. However, the aspects of this disclosure are not limited to these examples, and the DL control channel monitoring indicator can include more than one bits.

According to some aspects, after receiving the LP-WUS (using the LP-WUR), the UE can be configured to determine whether the LP-WUS can be used for RRM measurement. According to some aspects, the RRM measurement can include Reference Signal Received Power (RSRP). However, other aspects of this disclosure can include other measurement information that can be used for mobility measurement and determination. For example, the UE can use the RRM measurement to determine whether a handover operation is to be performed. If the LP-WUS can be used for the RRM measurement, the UE can perform the RRM measurement based on LP-WUS using the UE's LP-WUS. The UE can then use the RRM measurement for mobility procedure. Therefore, by using a low-power receiver (LP-WUR—e.g., a receiver that consumes less power compared to the main transceiver), the UE can improve its power consumption.

According to some aspects, the LP-WUS (e.g., the LP-WUS 301) can include one or more components. For example, the LP-WUS 301 can include one or more of a LP-WUS part 1 303, a LP-WUS part 2 305, and/or LP-WUS part 3 307. Although three components are shown in FIG. 3, the LP-WUS 301 can include less (e.g., one or two components) or the LP-WUS 301 can include more than three components.

According to some aspects, the LP-WUS part 1 303 can be used for the receiver frequency offset, timing error compensation, and/or synchronization. In other words, the LP-WUR of the UE can use the LP-WUS part 1 303 frequency synchronization and/or time synchronization.

According to some aspects, the LP-WUS part 2 305 can be used for RRM measurement. The RRM measurement can be used for mobility. According to some aspects, the UE can be configured to determine whether the LP-WUS 301 can be used for RRM measurement by determining that the LP-WUS 301 includes the LP-WUS part 2 305 (e.g., an LP-WUS part for RRM measurement). Additionally, or alternatively, the UE can be configured to determine whether the LP-WUS 301 can be used for RRM measurement by determining that the LP-WUS 301 includes information for RRM measurement. The UE can use other methods determine whether the LP-WUS 301 can be used for RRM measurement.

According to some aspects, the LP-WUS part 3 307 can be used to carry DL control channel monitoring indicator. The DL control channel monitoring indicator can be used for DL control channel (e.g., PDCCH) monitoring indication. As discussed above, the DL control channel monitoring indicator received by the LP-WUR can inform the UE to turn on its main radio to monitor the upcoming DL control channel.

According to some aspects, one or more of the LP-WUS part 1 303, the LP-WUS part 2 305, and/or the LP-WUS part 3 307 can reuse the existing signals. For example, synchronization signal block (SSB) can be considered to achieve the functions of the LP-WUS part 1 303 and/or the functions of the LP-WUS part 2 306.

According to some aspects, two or more of the LP-WUS part 1 303, the LP-WUS part 2 305, and/or the LP-WUS part 3 307 may be combined. For example, a single LP-WUS part may achieve the function of the LP-WUS part 2 303 and/or the LP-WUS part 3 307. For example, one single LP-WUS part may be used for carrying both the DL control channel monitoring indicator and the RRM measurement.

According to some aspects, the LP-WUS 301 may include some (but not all) of the LP-WUS part 1 303, the LP-WUS part 2 305, and/or the LP-WUS part 3 307. For example, if LP-WUS part 2 305 and/or LP-WUS part 3 307 are very robust to frequency/timing error, then the LP-WUS part 1 303 may not be needed. In this case, the LP-WUS part 1 303 may be eliminated.

According to some aspects, the time domain coverage improvement, the power domain coverage improvement, the spatial domain coverage improvement, and/or the frequency domain coverage improvement of this disclosure can be applied to one or more of the LP-WUS part 1 303, the LP-WUS part 2 305, and/or the LP-WUS part 3 307. For example, the coverage improvements of this disclosure can be applied to one of LP-WUS part 1 303, the LP-WUS part 2 305, or the LP-WUS part 3 307. For example, the coverage improvements of this disclosure can be applied to two of LP-WUS part 1 303, the LP-WUS part 2 305, or the LP-WUS part 3 307. For example, the coverage improvements of this disclosure can be applied to all of LP-WUS part 1 303, the LP-WUS part 2 305, and the LP-WUS part 3 307.

According to some aspects, the base station can continuously transmit the LP-WUS 301. In some examples, the base station can continuously transmit the LP-WUS 301 with time domain gaps as discussed in more detail below. According to some aspects, the base station can periodically transmit the LP-WUS 301. In some examples, the base station can periodically transmit the LP-WUS 301 with time domain gaps as discussed in more detail below.

FIGS. 4A-4E illustrate exemplary LP-WUS and/or LP-WUS parts with time domain coverage improvement, according to some aspects of the disclosure. As a convenience and not a limitation, FIGS. 4A-4E may be described with regard to elements of FIGS. 1-3.

According to some aspects, for the LP-WUS, which is transmitted by the base station (e.g., the base station 101 of FIG. 1), the time domain duration can be designed to be long enough to compensate for the potential receiver sensitivity loss. Additionally, or alternatively, for a particular LP-WUS part of the LP-WUS (e.g., LP-WUS part 1, LP-WUS part 2, and/or LP-WUS part 3), the time domain duration can be designed to be long enough to compensate for the potential receiver sensitivity loss.

According to some aspects, the longer time domain duration can mean that the information in the LP-WUS and/or in the LP-WUS parts are repeated such that the LP-WUR of the UE is able to accumulate more energy over time to combat the receiver sensitivity loss. For example, the DL control channel monitoring indicator in the LP-WUS and/or in the LP-WUS parts are repeated such that the LP-WUR of the UE is able to accumulate more energy over time to combat the receiver sensitivity loss. In some aspects, the DL control channel monitoring indicator can include one or more bits. The one or more bits of the DL control channel monitoring indicator can be repeated to achieve the longer time domain duration. In some aspects, the RRM measurement can be based on the LP-WUS and/or in the LP-WUS parts are repeated to achieve the longer time domain duration.

Figures 4A, 4B, 4C:
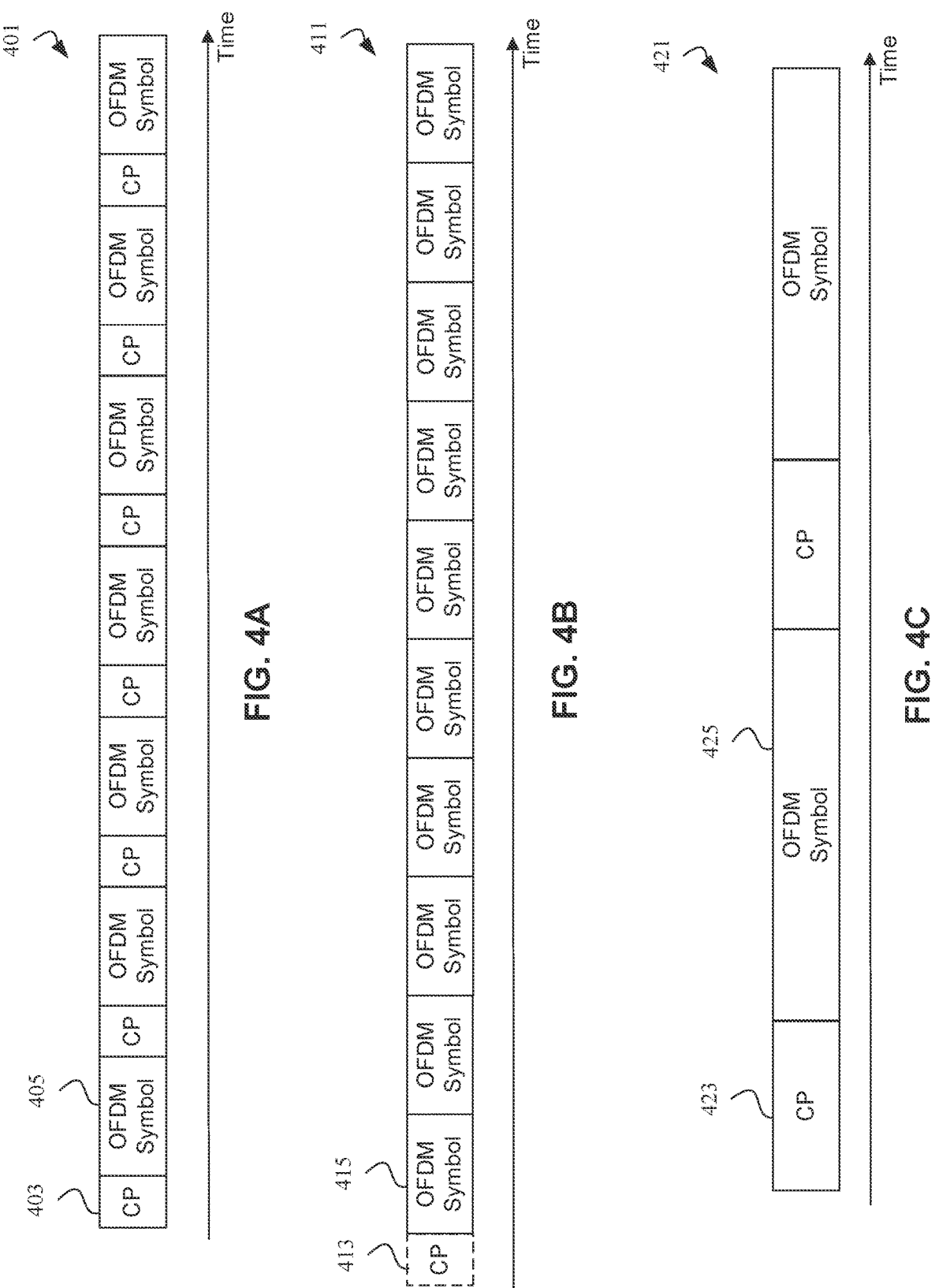
FIGS. 4A-4E illustrate exemplary LP-WUS and/or LP-WUS parts with time domain coverage improvement, according to some aspects of the disclosure.

FIG. 4A illustrates an exemplary LP-WUS part 401 with time domain coverage improvement, according to some aspects. The LP-WUS part 401 can be one or more of the LP-WUS part 1 303, the LP-WUS part 2 305, and/or the LP-WUS part 3 307 of FIG. 3. Although FIG. 4A is discussed with respect to the LP-WUS part 401, the signal 401 can be a LP-WUS.

According to some aspects, the LP-WUS part 401 (or the LP-WUS) can include one or more cyclic prefixes (CP) 403 and one or more orthogonal frequency-division multiplexing (OFDM) symbols 405. The LP-WUS part 401 (or the LP-WUS) can aggregate a plurality of OFDM symbols 405 with their corresponding CP 403. For example, the LP-WUS part 401 can use the existing NR main radio OFDM numerology, with time slot aggregation (e.g., OFDM symbol aggregation). According to some aspects, the LP-WUS part 401 can aggregate a plurality of time slots with a given SCS. In some aspects, the LP-WUS part 401 can aggregate, for example, a plurality of NR slots with 15 kHz subcarrier spacing SCS (e.g., each slot of 1 ms duration). According to some aspects, the number of aggregated slots can include 16, 32, 64, 128, or the like. However, the aspects of this disclosure are not limited to this example, and the number of aggregated slots can be any other positive integer number. Also, the aspects of this disclosure are not limited to this exemplary SCS, and the LP-WUS part 401 can aggregate NR slots with other SCS such as, but not limited to, 30 kHz, 60 kHz, 120 kHz, or the like. As illustrated in FIG. 4A, the LP-WUS part 401 can aggregate one or more slots with their own CPs.

According to some aspects, two or more of the OFDM symbols 405 are the same OFDM symbol that are repeated in the LP-WUS part 401. Similarly, two or more of the CPs 403 associated with the two or more of the OFDM symbols 405 are the same CP that are repeated in the LP-WUS part 401. In some examples, the number of repeated OFDM symbols 405 can be in tens, hundreds, thousands, tens of thousands, and the like.

FIG. 4B illustrates an exemplary LP-WUS part 411 with time domain coverage improvement, according to some aspects. The LP-WUS part 411 can be one or more of the LP-WUS part 1 303, the LP-WUS part 2 305, and/or the LP-WUS part 3 307 of FIG. 3. Although FIG. 4B is discussed with respect to the LP-WUS part 411, the signal 411 can be a LP-WUS.

According to some aspects, the LP-WUS part 411 (or the LP-WUS) can include one or more OFDM symbols 415. The LP-WUS part 411 (or the LP-WUS) can aggregate a plurality of OFDM symbols 415 without their corresponding CP. For example, the LP-WUS part 411 can use the existing NR main radio OFDM numerology, with time slot aggregation (e.g., OFDM symbol aggregation). In some aspects, the LP-WUS part 411 can aggregate, for example, a number of NR slots with 15 kHz subcarrier spacing SCS (e.g., each slot of 1 ms). According to some aspects, the number of aggregated slots can include 16, 32, 64, 128, or the like. However, the aspects of this disclosure are not limited to this example, and the number of aggregated slots can be any other positive integer number. Also, the aspects of this disclosure are not limited to this example, and the LP-WUS part 411 can aggregate NR slots with other SCS such as, but not limited to, 30 kHz, 60 kHz, 120 kHz, or the like. As illustrated in FIG. 4B, the LP-WUS part 411 can aggregate one or more slot without their CPs.

According to some aspects, two or more of the OFDM symbols 415 are the same OFDM symbol that are repeated in the LP-WUS part 411. In some examples, the number of repeated OFDM symbols 415 can be in tens, hundreds, thousands, tens of thousands, and the like. According to some aspects, the LP-WUS part 411 can aggregate one or more slots with only one CP 413. In other words, the CP 413 can be an optional CP when one or more slots are aggregated with only one CP.

FIG. 4C illustrates an exemplary LP-WUS part 421 with time domain coverage improvement, according to some aspects. The LP-WUS part 421 can be one or more of the LP-WUS part 1 303, the LP-WUS part 2 305, and/or the LP-WUS part 3 307 of FIG. 3. Although FIG. 4C is discussed with respect to the LP-WUS part 421, the signal 421 can be a LP-WUS.

According to some aspects, the LP-WUS part 421 (or the LP-WUS) can include one or more CPs 423 and one or more OFDM symbols 425. The LP-WUS part 421 (or the LP-WUS) can aggregate a plurality of OFDM symbols 425 with their corresponding CP 423. According to some aspects, the LP-WUS part 421 can use other NR OFDM numerology for OFDM symbol aggregation. For example, the LP-WUS part 421 can use OFDM numerology with smaller SCS compared to the LP-WUS part 401 and the LP-WUS part 411. In some aspects, the OFDM numerology can use SCS of 1.25 kHz, 5 kHz, 15/32 kHz, or the like. By using the smaller SCS, the time duration of the OFDM symbols 425 (e.g., the time duration of the time slots) and/or the time duration of CPs 423 are increased compared to the LP-WUS part 401 of FIG. 4A and the LP-WUS part 411 of FIG. 4B. In these examples, the time domain coverage improvement can be achieved with using OFDM numerology with smaller SCS and/or aggregating the OFDM symbols.

However, the aspects of this disclosure are not limited to these examples and can use other SCSs. According to some aspects, the LP-WUS part 421 uses other NR OFDM numerology with slot aggregation (e.g., OFDM symbol aggregation). Additionally, or alternatively, the LP-WUS part 421 use the other NR OFDM numerology without slot aggregation. As illustrated in FIG. 4C, the LP-WUS part 421 can aggregate one or more slots (e.g., one or more OFDM symbols 425) with their own CPs.

According to some aspects, for the LP-WUS part 421 (or the LP-WUS), when smaller OFDM SCS are considered, the CP length can scale linearly with reference to 15 kHz SCS and/or the CP length can be different.

According to some aspects, the OFDM numerology (as discussed with respect to FIGS. 4A, 4B, and/or 4C) can include OFDM SCS (e.g., symbol durations), OFDM CP length, and slot duration (e.g., the number of symbols per slot).

According to some aspects, two or more of the OFDM symbols 425 are the same OFDM symbol that are repeated in the LP-WUS part 421. Similarly, two or more of the CPs 423 associated with the two or more of the OFDM symbols 425 are the same CP that are repeated in the LP-WUS part 421. In some examples, the number of repeated OFDM symbols 425 can be in tens, hundreds, thousands, tens of thousands, and the like.

Figures 4D, 4E:
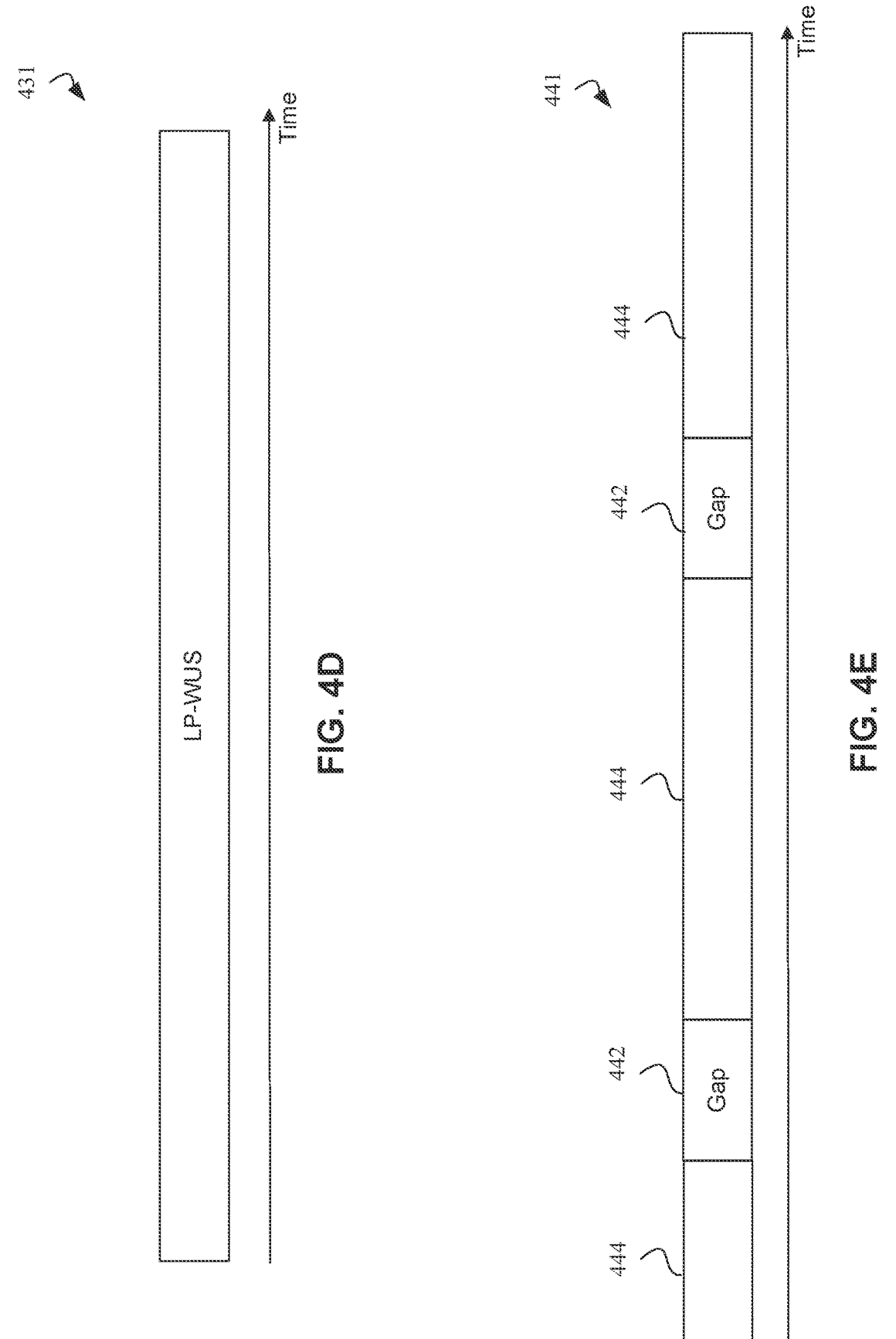

FIG. 4D illustrates an exemplary LP-WUS 431 with time domain coverage improvement, according to some aspects. Although FIG. 4D is discussed with respect to the LP-WUS 431, the signal 431 can be a LP-WUS part. In some aspects that the signal 431 is a LP-WUS part, the LP-WUS part can be one or more of the LP-WUS part 1 303, the LP-WUS part 2 305, and/or the LP-WUS part 3 307 of FIG. 3.

According to some aspects, the LP-WUS 431 can be based on a new numerology that is not based on OFDM. In some aspects, the new numerology can include transmission time duration.

FIG. 4E illustrates exemplary LP-WUS 441 with gaps 442 with time domain coverage improvement, according to some aspects. Although FIG. 4E is discussed with respect to the LP-WUS 441, the signal 441 can be a LP-WUS part. In some aspects that the signal 441 is a LP-WUS part, the LP-WUS part can be one or more of the LP-WUS part 1 303, the LP-WUS part 2 305, and/or the LP-WUS part 3 307 of FIG. 3.

According to some aspects, when extended transmission duration is used for the LP-WUS 441 to combat receiver sensitivity loss for the LP-WUR, to facilitate Time Division Duplex (TDD) deployment by providing more UL transmission opportunities in the system, one or multiple time domain gaps 442 can be configured/indicated within the LP-WUS 441. In other words, time domain gaps 442 are configured/indicated within the LP-WUS 441 between different sections 444 of the LP-WUS 441. During the time domain gaps 442, the UE (e.g., the UE 103 of FIG. 1) is not expected to receive the LP-WUS 441.

According to some aspects, the time domain gaps 442 can be applied to the LP-WUS and/or the LP-WUS parts of FIGS. 4A-4D discussed above to facilitate TDD deployment. For example, a time domain gap 442 can be applied between an OFDM symbol 405 and a CP 403 consecutively after the OFDM symbol 405 in FIG. 4A. In another example, a time domain gap 442 can be applied between an OFDM symbol 415 and another OFDM symbol consecutively after the OFDM symbol 415 in FIG. 4B. In another example, a time domain gap 442 can be applied between an OFDM symbol 425 and a CP 423 consecutively after the OFDM symbol 415 in FIG. 4C. According to some aspects, when FDD is used, the time domain gaps 422 are not used with the LP-WUS and/or the LP-WUS parts of FIGS. 4A-4D discussed above.

According to some aspects, the base station (e.g., the base station 101 of FIG. 1) and the UE (e.g., the UE 103 of FIG. 1) can communicate which one or more of the time domain coverage improvement implementations of FIGS. 4A-4E to use. In some aspects, the UE can use one or more messages to communicate to the base station its capabilities. The UE's capabilities can include which one or more of the time domain coverage improvement implementations of FIGS. 4A-4E to use. The one or more messages used by the UE can include message(s) used for establishing initial connection between the UE and the base station. For example, the UE can use radio resource control (RRC) configuration messages to communicate to the base station which one or more of the time domain coverage improvement implementations of FIGS. 4A-4E to use.

Additionally, or alternatively, the base station can communicate to the UE which one or more of the time domain coverage improvement implementations of FIGS. 4A-4E to use. For example, the UE can receive the information associated with which one or more of the time domain coverage improvement implementations of FIGS. 4A-4E to use using RRC configuration (e.g., an RRC message) from the base station. However, the aspects of this disclosure are not limited to these examples, and other method can be used between the UE and the base station to communicate which one or more of the time domain coverage improvement implementations of FIGS. 4A-4E to use.

In addition to, or alternatively to, using the time domain coverage improvement, the base station can use power domain coverage improvement for transmission of the LP-WUS and/or the LP-WUS parts. According to some aspects, to compensate for the coverage loss due to the degraded receiver sensitivity of the UE's LP-WUR, the base station can boost the transmission power of the LP-WUS (and/or the LP-WUS parts).

According to some aspects, the UE can report its desired transmission power boost to the base station. The desired transmission power boost can be based on expected receiver sensitivity loss of the UE's LP-WUR. In some aspects, the UE can send its desired transmission power boost to the base station using one or more messages used by the UE to report its capabilities to the base station. For example, the UE can use RRC for RRC CONNECT state and/or RRC IDLE/ INACTIVE state to communicate to the base station the UE's desired transmission power boost.

According to some aspects, the desired transmission power boost can be based on the location of the UE with respect to the base station (e.g., the distance between the UE and the base station). For example, the closer the UE is to the base station, the less transmission power boost the UE would need. However, the further the UE is from the base station (and the closer the UE is to the edge of the base station's coverage area), the more transmission power boost the UE wound need. In some aspects, the UE can determine a received signal's power (e.g., reference signal received power (RSRP)) and use the received signal's power to determine the UE's desired transmission power boost. For example, the UE can use reference signal(s) (e.g., SSB, channel state information reference signal (CSI-RS), or the like) from the base station to determine the received signal's power. The UE can use the received signal's power to determine the distance between the UE and the base station. The UE can use the determined distance between the UE and the base station (and/or the determined received signal's power) to determine the desired transmission power boost. The UE can transmit its desired transmission power boost to the base station. In other words, the UE can transmit its desired transmission power boost to the base station in response to determining whether and how much transmission power boost the UE desires. The UE determines the value of the desired transmission power boost based on the determined power of, for example, a reference signal that the UE receives from the base station. According to some aspects, the desired transmission power boost can be indicated relative to the received signal's power.

After receiving the desired transmission power boost from the UE, the base station can adjust (e.g., increase, decrease, or maintain) the transmission power of the subsequent LP-WUSs based on the received desired transmission power boost. The base station can transmit the subsequent LP-WUSs using the adjusted transmission power.

In addition to, or alternatively to, the closed loop method discussed above, an open loop method can be used for power domain coverage improvement. According to some aspects, the desired power boost can be indicated indirectly as part of, for example, the UL transmission power control. For example, the UE can have previously reported its desired transmission power boost (e.g., based on expected loss of receiver sensitivity of the LP-WUR of the UE) to the base station using a capability message. The UL transmission power control can be updated to include the UE's desired transmission power boost. The UL transmission power control can be used to increase or decrease the uplink transmit power of UE to meet signal to noise ratio (SNR) requirement and/or to meet bit error rate (BER) requirement of the base station.

According to some aspects, the following UL transmission power control (P_tx) can be used:

$$P\_tx=\min\{Pc,\max,P0+alpha*PL+10*\log_{10}(N\_RB)+ \text{delta}-\text{Loss}\_\{REFSENS\}\} \quad \text{Equation (1)}$$

The Pc,max of Equation (1) indicates a maximum transmission power. The P0 of Equation (1) indicates target receiving power, which can be configured by RRC signaling. The alpha of Equation (1) is a pathloss compensation factor, which can be configured by RRC signaling. The PL of Equation (1) indicates the pathloss estimate, which can be derived based on higher layer filtered reference signal received power (RSRP) such as, but not limited to, layer 3 RSRP (L3-RSRP).

The N_RB of Equation (1) indicates the bandwidth in terms of number of resource blocks (RBs) based on a reference numerology. The delta of Equation (1) indicates other existing power control parameters.

The UL transmission power control (P_tx) of Equation (1) includes an additional parameter loss_{REFSENS} (also referred herein as loss parameter) that can indicate the expected loss of receiver sensitivity of the LP-WUR of the UE. According to some aspects, the loss_{REFSENS} parameter can include, but is not limited to, noise figure increase, or the like. The loss_{REFSENS} parameter is a negative number and is a parameter that can indicate the UE's desired transmission power boost (e.g., by how much the base station is to boost the transmission power of the LP-WUS). By using the loss_{REFSENS} parameter in the UL transmission power control (P_tx) of Equation (1), the base station can indicate to the UE by how the base station boots the transmission power of the LP-WUS.

According to some aspects, the base station can adjust the transmission power of the LP-WUS based on the power of received signals from the UE. For example, when the base station receives a signal from a UE that is far from the base station, the base station detects a weak received signal. Based on the detected weak signal, the base station can increase the transmission power of the LP-WUS. In another example, when the base station receives a signal from the UE that is close to the base station, the base station detects a strong received signal. Based on the detected strong signal, the base station can decrease the transmission power of the LP-WUS. The UL transmission power control (P_tx) of Equation (1) indicates the transmission power for the UE sending signals to the base station. This UL transmission power control (P_tx) of Equation (1) is adjusted by the additional parameter loss_{REFSENS} (also referred herein as loss parameter) to indicate the expected loss of receiver sensitivity of the LP-WUR of the UE.

According to some aspects, the UE's desired transmission power boost (communicated directly or indirectly) can be UE specific. In other words, each UE can have UE specific desired transmission power boost that is based on the UE's specific expected receiver sensitivity loss of the UE's LP-WUR. Additionally, or alternatively, the UE's desired transmission power boost can be the same for one or more of the UEs. In some examples, a first set of UEs can have the same desired transmission power boost, which is different that the desired transmission power boost of a second set of UEs (that is different from the first set of UEs).

As discussed above, the base station can boost the transmission power of the LP-WUS (and/or the LP-WUS parts) to compensate for the coverage loss due to the degraded receiver sensitivity of the UE's LP-WUR. The base station can use an absolute parameter and/or a relative parameter for the transmission power boost.

According to some aspects, the desired transmission power boost that the UE communicates (directly or indirectly) to the base station can be an absolute transmission power value. For example, the UE can use an absolute transmission power value (e.g., in decibel (dB), decibel-milliwatts (dBm), or the like) as the UE's desired transmission power boost. The UE can communicate the absolute transmission power value directly or indirectly to the base station.

According to some aspects, the desired transmission power boost that the UE communicates (directly or indirectly) to the base station can be an absolute transmission power offset value. For example, the UE can use an absolute transmission power offset value (e.g., dBm, dB, or the like) as the UE's desired transmission power boost. The UE can communicate the absolute transmission power offset value directly or indirectly to the base station. According to some aspects, the absolute transmission power offset value can be with respect to transmission power of a reference signal, such as, but not limited to, SSB, CSI-RS, or the like.

According to some aspects, the desired transmission power boost that the UE communicates (directly or indirectly) to the base station can be in relative terms. For example, the UE can indicate (directly or indirectly) to the base station whether to increase or to reduce the transmission power of the LP-WUS. For example, the UE can determine whether the UE is moving toward the base station or moving away from the base station. If the UE determines that the UE is moving toward the base station, the UE can indicate to the base station to decrease the transmission power for the LP-WUS by a first value. If the UE determines that the UE is moving away from the base station, the UE can indicate to the base station to increase the transmission power for the LP-WUS by a second value. In some aspects, the first and second values can be the same. In some aspects, the first and second values are different. In some aspects, if the UE determines that the UE is not moving away from or is not moving toward the base station, the UE can indicate to the base station to maintain the transmission power for the LP-WUS.

According to some aspects, the UE is configured to communicate (directly or indirectly) to the base station an absolute transmission power adjustment of the LP-WUS. The absolute transmission power adjustment can be an adjustment from a reference transmission power. Additionally, or alternatively, the absolute transmission power adjustment can be with respect to the latest indication from the UE that is received at the base station. In other words, the absolute transmission power adjustment can be with respect to the latest (e.g., previous) transmission power that the base station used to transmit the latest (e.g., previous) LP-WUS.

According to some aspects, the UE is configured to communicate (directly or indirectly) to the base station an accumulative transmission power adjustment of the LP-WUS. The accumulative transmission power adjustment can be an adjustment from a reference transmission power. Additionally, or alternatively, the accumulative transmission power adjustment can be with respect to the accumulation/summation of one or multiple previously indications from the UE that are received at the base station. In other words, the accumulative transmission power adjustment can be with respect to the accumulation/summation of one or multiple previous transmission powers that the base station used to transmit the one or multiple previous LP-WUS.

In addition to, or alternatively to, using the time domain coverage improvement and/or the power domain coverage improvement, the base station can use spatial domain coverage improvement for transmission of the LP-WUS and/or the LP-WUS parts. According to some aspects, to compensate for the coverage loss due to the degraded receiver sensitivity of the UE's LP-WUR, the base station can use spatial domain coverage improvement for transmission of the LP-WUS (and/or the LP-WUS parts).

According to some aspects, the base station can use beam sweeping to increase the beam diversity for the LP-WUS (and/or the LP-WUS parts). In other words, the base station ca use one or more beams for transmitting different sections of the LP-WUS (and/or the LP-WUS parts).

According to some aspects, for a particular LP-WUS part (and/or for a particular LP-WUS), the base station can use different spatial domain filter for different frequency domain resource and/or for different time domain resource for the corresponding LP-WUS part (and/or for the corresponding LP-WUS). According to some aspects, the spatial domain filter can be a digital precoder or an analog precoder.

Figures 5A, 5B:
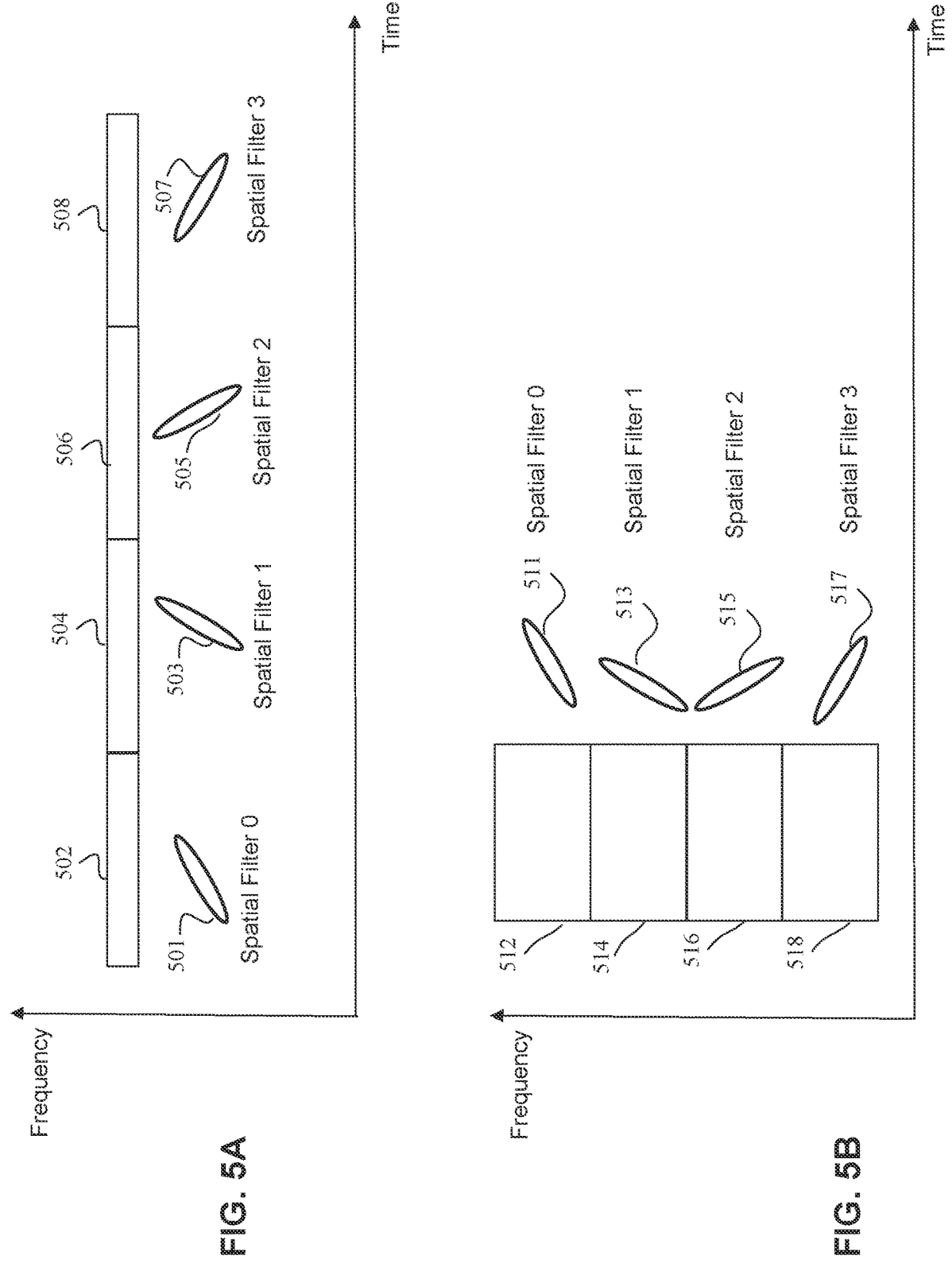
FIG. 5A illustrates exemplary spatial domain filters used for different time domain resources, according to some aspects of this disclosure.
FIG. 5B illustrates exemplary spatial domain filters used for different frequency domain resources, according to some aspects of this disclosure.

FIG. 5A illustrates exemplary spatial domain filters used for different time domain resources, according to some aspects of this disclosure. As illustrated in the exemplary spatial domain coverage improvement of FIG. 5A, the base station (e.g., the base station 101 of FIG. 1) can use a first spatial domain filter 501 (spatial domain filter 0) for a first set of symbols 502 in the time domain for a particular LP-WUS part (and/or for a particular LP-WUS). The base station can use a second spatial domain filter 503 (spatial domain filter 1) for a second set of symbols 504 in the time domain for the particular LP-WUS part (and/or for the particular LP-WUS). The base station can use a third spatial domain filter 505 (spatial domain filter 2) for a third set of symbols 506 in the time domain for the particular LP-WUS part (and/or for the particular LP-WUS). The base station can use a fourth spatial domain filter 507 (spatial domain filter 3) for a fourth set symbols 508 in the time domain for the particular LP-WUS part (and/or for the particular LP-WUS).

FIG. 5B illustrates exemplary spatial domain filters used for different frequency domain resources, according to some aspects of this disclosure. As illustrated in the exemplary spatial domain coverage improvement of FIG. 5B, the base station (e.g., the base station 101 of FIG. 1) can use a first spatial domain filter 511 (spatial domain filter 0) for a first set of symbols 512 in the frequency domain for a particular LP-WUS part (and/or for a particular LP-WUS). The base station can use a second spatial domain filter 513 (spatial domain filter 1) for a second set of symbols 514 in the frequency domain for the particular LP-WUS part (and/or for the particular LP-WUS). The base station can use a third spatial domain filter 515 (spatial domain filter 2) for a third set of symbols 516 in the frequency domain for the particular LP-WUS part (and/or for the particular LP-WUS). The base station can use a fourth spatial domain filter 517 (spatial domain filter 3) for a fourth set of symbols 518 in the frequency domain for the particular LP-WUS part (and/or for the particular LP-WUS).

Although four spatial domain filters and four time/frequency domain resources are shown in FIGS. 5A and 5B, the aspects of this disclosure are not limited to these examples, and the base station can use any number of spatial domain filters for any number of time/frequency domain resources.

According to some aspects, the base station can explicitly configure the employed spatial domain filter via Quasi-Colocation (QCL) configuration. In some aspects, when two symbols (and/or signals) are QCLed, these two symbols (and/or signals) have similar properties. For example, when two symbols (and/or signals) are QCLed, these two symbols (and/or signals) can have gone through the same spatial domain filter (e.g., they are transmitted using the same beam). Therefore, if the UE receives the first symbol and can determine the properties of the first symbol, the UE will know that the second symbol (that is QCLed with the first symbol) has similar properties as the first symbol.

For example, the first set of symbols 502 are QCLed to indicate that the first set of symbols 502 are transmitted using the same beam (e.g., the same spatial domain filter 501). The second set of symbols 504 are QCLed to indicate that the second set of symbols 504 are transmitted using the same beam (e.g., the same spatial domain filter 503). However, the first set of symbols 502 are not QCLed with the second set of symbols 504 to indicate that the first set of symbols 502 are transmitted using a beam (e.g., the spatial domain filter 501) different from the beam (e.g., the spatial domain filter 503) used for the second set of symbols 504. Similar indication can be used for the frequency domain example of FIG. 5B.

According to some aspects, the base station can explicitly configure the employed spatial domain filter using legacy Transmission Configuration Indication (TCI) State and/or Unified TCI State. In other words, the base station can explicitly indicate which beam (e.g., which spatial domain filter) is used for different symbols (in sets of symbols 502, 504, 506, 508, 522, 524, 526, and/or 508) using the TCI State and/or the Unified TCI State.

According to some aspects, when the frequency domain selective spatial domain filter (e.g., FIG. 5B) is used, the base station can configure the basic frequency domain resource unit for applying the different spatial domain filter(s). According to some aspects, the basic frequency domain resource unit can be a certain number of physical resource blocks (PRBs) and/or a frequency hop.

According to some aspects, when the time domain selective spatial domain filter (e.g., FIG. 5A) is used, the base station can configure the basic time domain resource unit for applying the different spatial domain filter(s). According to some aspects, the basic time domain resource unit can be a certain number of slots and/or a number of millisecond (ms).

According to some aspects, when frequency and/or time domain resource unit is configured for applying the different spatial domain filter(s), different patterns can be used to apply different spatial domain filter to different source units. In some aspects, a cyclic pattern can be used to apply different spatial domain filter to different source units. For example, the cyclic pattern can include $\{S_1, S_2, S_3, S_4, S_1, S_2, S_3, S_4, \ldots\}$. In this exemplary cyclic pattern $S_i$ is the $i^{th}$ spatial domain filter (e.g., $i^{th}$ beam). As discussed above, the number of spatial domain filters can be different than four spatial domain filters provided above.

In some aspects, a sequential pattern can be used to apply different spatial domain filter to different source units. For example, one spatial domain filter is used two or more times before another spatial domain filter is used. For example, the sequential pattern can include $\{S_1, S_1, S_2, S_2, S_3, S_3, S_4, S_4, \ldots\}$. In this exemplary cyclic pattern $S_i$ is the $i^{th}$ spatial domain filter (e.g., $i^{th}$ beam). As discussed above, the number of spatial domain filters can be different than four spatial domain filters provided above.

According to some aspects, the base station (e.g., the base station 101) can implicitly configure selective spatial domain filter(s). According to some aspects, the base station does not explicitly indicate to the UE which beams (e.g., the spatial domain filters) the base station is using for different sections of the LP-WUS (or the LP-WUS parts). However, the base station can indicate that the LP-WUS (or the LP-WUS parts) are divided into one or more sections, and the base station uses different beams for each section.

In some aspects when the frequency domain selective spatial domain filter is used, the base station can configure the basic frequency domain resource unit for applying the different spatial domain filter(s). The basic unit can be a certain number of PRBs and/or a frequency hop. In a non-limiting example, the base station can configure and indicate to the UE that a beam (e.g., a spatial domain filter)

is used for every 100 PRBs and the beam (e.g., the spatial domain filter) is changed between the sets of 100 PRBs. This is a non-limiting example that does not limit the aspect of this disclosure.

In some aspects when the time domain selective spatial domain filter is used, the base station can configure the basic time domain resource unit for applying the different spatial domain filter. The basic unit can be a certain number of slots and/or a number of ms. In a non-limiting example, the base station can configure and indicate to the UE that a beam (e.g., a spatial domain filter) is used for every 100 slots and the beam (e.g., the spatial domain filter) is changed between the sets of 100 slots. This is a non-limiting example that does not limit the aspect of this disclosure.

According to some aspects, across different frequency domain resources units and/or time domain resources units, UE cannot assume the same precoding is applied for the corresponding LP-WUS.

In addition to, or alternatively to, using the time domain coverage improvement, the power domain coverage improvement, and/or the spatial domain coverage improvement, the base station can use frequency domain coverage improvement for transmission of the LP-WUS and/or the LP-WUS parts. According to some aspects, to compensate for the coverage loss due to the degraded receiver sensitivity of the UE's LP-WUR, the base station can use frequency domain coverage improvement for transmission of the LP-WUS (and/or the LP-WUS parts).

Figure 6A:
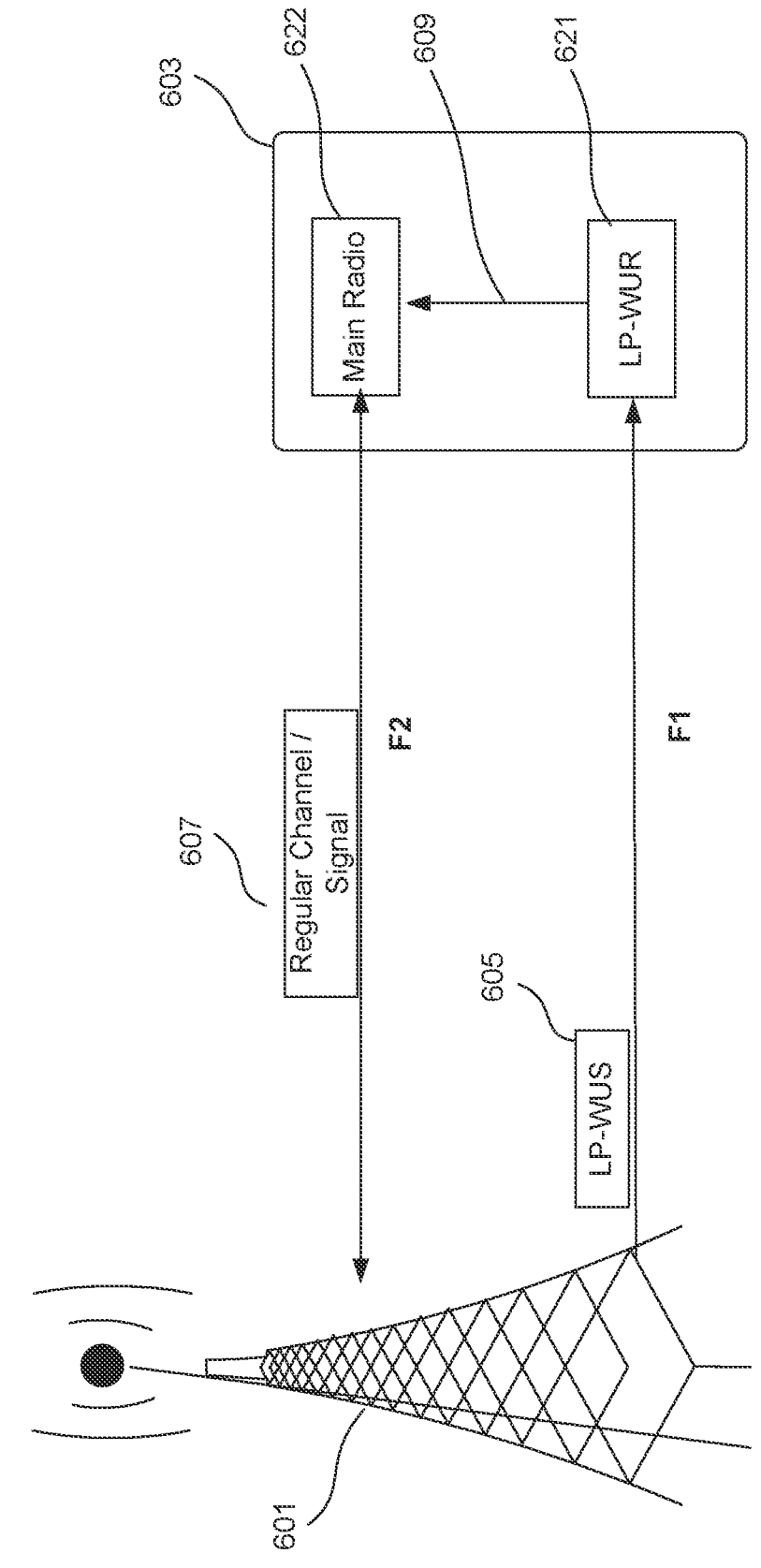
FIG. 6A illustrates an exemplary system for operating the LP-WUS on a separate frequency from the main radio for frequency domain coverage improvement, according to some aspects of this disclosure.

FIG. 6A illustrates an exemplary system for operating the LP-WUS on a separate frequency from the main radio, according to some aspects of this disclosure. As a convenience and not a limitation, FIG. 6A may be described with regard to elements of FIGS. 1-2. Similar to FIG. 1, FIG. 6A illustrates a system 600 that include a base station 601 and a UE 603. The base station 601 can be similar to the base station 101 of FIG. 1. The UE 603 can be similar to the UE 103 of FIG. 1.

According to some aspects, the UE 603 can include a LP-WUR 621 and a main transceiver (e.g., a main radio) 622. According to some aspects, the LP-WUR 621 and the main transceiver 622 can operate on different frequencies. For example, the LP-WUR 621 can operate on a first frequency (F1) and the main transceiver 622 can operate on a second frequency (F2) that is different from the first frequency. In other words, the LP-WUR 621 and the main transceiver 622 can operated on separate frequencies. Although a first frequency (F1) and a second frequency (F2) are discussed, the aspects of this disclosure can include a first set of frequencies on which the LP-WUR 621 operates and second set of frequencies on which the main transceiver 622 operates. Additionally, or alternatively, one or more CCs of a plurality of CCs can be dedicated for the LP-WUS 605. The LP-WUR 621 can operated on this dedicated one or more CCs. This dedicated one or more CCs will not be used for any other communications, according to some aspects.

According to some aspects, the frequency that the LP-WUR 621 operates on can be dedicated to the operation of the LP-WUR 621. For example, the frequency that the LP-WUR 621 operates on can be dedicated to LP-WUR operation only. In some aspects, the frequency that the LP-WUR 621 operates on can have narrower bandwidth (BW) compared to the frequency on which the main transceiver 622 operates. For example, the frequency that the LP-WUR 621 operates on can have a BW of 180 KHz, 200 kHz, 1 MHz, or the like. According to some aspects, the frequency that the LP-WUR 621 operates on can be in a licensed band or in an unlicensed band. According to some aspects, the frequency that the LP-WUR 621 operates on can be in a guard band associated with the operation of the main transceiver 622. For example, the frequency that the LP-WUR 621 operates on can be in a guard band associated with the frequency on which the main transceiver 622 operates on.

As illustrated in FIG. 6A, the base station 601 can transmit the LP-WUS 605 on the first frequency (e.g., F1) on which the LP-WUR 621 operates. According to some aspects, the base station transmits the LP-WUS 605 in preparation for (e.g., ahead of the time of) transmitting the regular channel/signal 607.

According to some aspects, the LP-WUR 621 can receive and detect the LP-WUS 605. After receiving the LP-WUS 605 using the LP-WUR 621 on the first frequency (e.g., F1), the UE 603 can determine that the LP-WUR includes, for example, the DL control channel monitoring indicator. After detecting, for example, the DL control channel monitoring indicator of the LP-WUS 605, the UE 603 can transition (e.g., at 609) its main transceiver 622 to the awake state. In other words, the UE 603 can wake up its main transceiver 622. At the awake state, the UE 603 can use its main transceiver 622 to communicate with the base station 601 at the second frequency (e.g., F2). For example, at the awake state, the UE 603 can use its main transceiver 622 to receive the regular channel/signal 607 from the base station 601 on the second frequency. According to some aspects, the regular channel/signal 607 can include the DL control channel information. Additionally, or alternatively, the UE 603 can use its main transceiver 622 to transmit a regular channel/signal to the base station 601 on the second frequency.

According to some aspects, the first frequency (F1) is lower compared to the second frequency (F2). By using the lower frequency F1, the path loss for the LP-WUS 605 can be improved. Therefore, the degraded receiver sensitivity of the UE's LP-WUR can be improved by using the frequency domain coverage improvement.

Figure 6B:
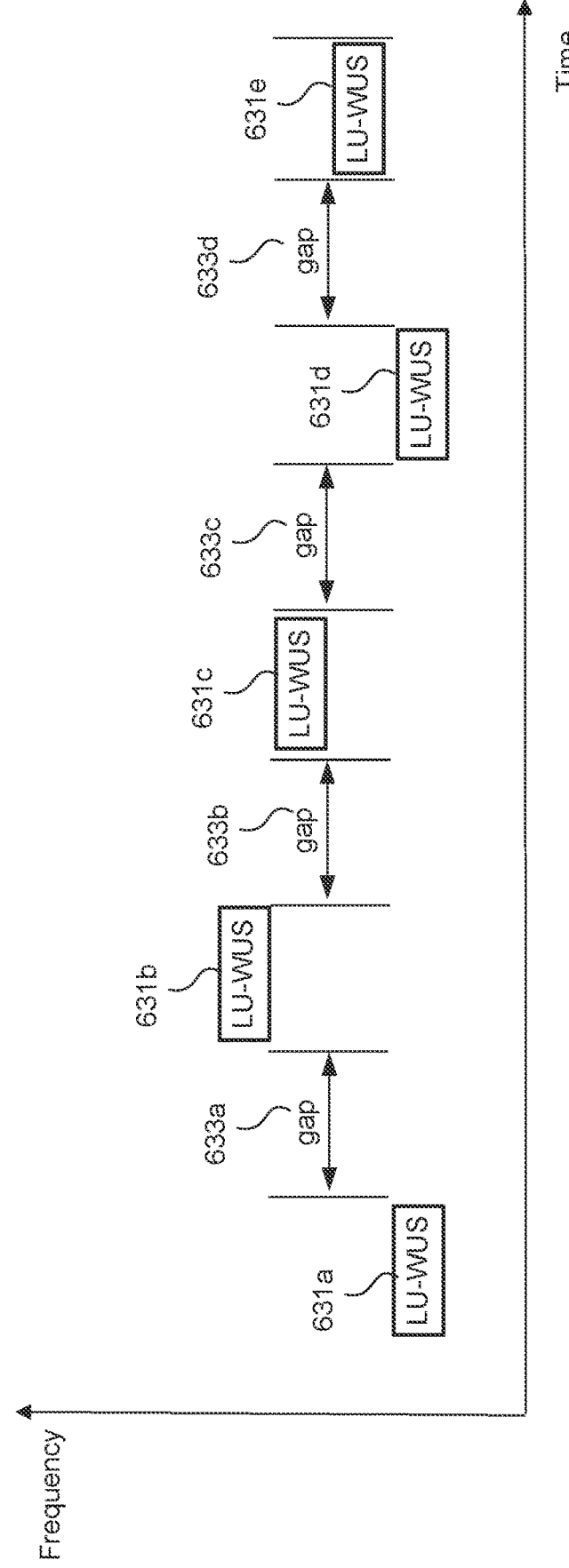
FIG. 6B illustrates an exemplary frequency domain coverage improvement using narrow bandwidth with frequency hopping, according to some aspects of this disclosure.

FIG. 6B illustrates an exemplary frequency domain coverage improvement using narrow bandwidth with frequency hopping, according to some aspects of this disclosure.

According to some aspects, for a particular LP-WUS part (and/or a particular LP-WUS), narrow bandwidth with frequency hopping can be used to both reduce the UE power consumption and improve the coverage by extended transmission duration and frequency diversity to combat the receiver sensitivity loss. In some examples, the narrow bandwidth can include, but is not limited to, 180 kHz, 200 kHz, 1 MHZ, or the like. According to some aspects, the narrow bandwidth can improve the UE's power consumption and the frequency hopping can increase diversity.

For example, at illustrated in FIG. 6B, the frequency hopping can be applied such that the LP-WUS parts (and/or LP-WUS) 631 are transmitted at different frequencies. For example, the base station can transmit the LP-WUS part 631*a* at a first frequency. The base station can transmit the LP-WUS part 631*b* at a fourth frequency. The base station can transmit the LP-WUS part 631*c* at a third frequency. The base station can transmit the LP-WUS part 631*d* at the first frequency. The base station can transmit the LP-WUS part 631*e* at a second frequency. The first, second, third, and fourth frequencies can be different frequencies. According to some aspects, each of the LP-WUS parts have a narrow bandwidth, as discussed above.

According to some aspects, for the LP-WUS with frequency hopping, time domain gap can be added between adjacent hops. For example, the time domain gap 633*a* can be added between the LP-WUS part 631*a* and the LP-WUS part 631*b*. The time domain gap 633*b* can be added between the LP-WUS part 631*b* and the LP-WUS part 631*c*. The time domain gap 633*c* can be added between the LP-WUS part 631*c* and the LP-WUS part 631*d*. The time domain gap 633*d* can be added between the LP-WUS part 631*d* and the LP-WUS part 631*c*.

According to some aspects, time domain gaps 633 can be configured by the base station (e.g., the base station 101 of FIG. 1 and/or the base station 601 of FIG. 6A). According to some aspects, the minimum duration of the time domain gap 633 can be reported as UE capability. For example, the UE (e.g., the UE 103 of FIG. 1 and/or the UE 603 of FIG. 6A) can use a signaling message (e.g., RRC signaling or other messages) to transmit the UE capability to the base station. The UE capability can include minimum duration of the time domain gap 633. Additionally, or alternatively, the minimum duration of the time domain gap 633 can be coded in the specification. The minimum duration of the time domain gap 633 can be used by the UE to handle the time needed for UE's LP-WUR 621 to switch between different frequencies. In other words, the minimum duration of the time domain gap 633 can be used to handle the time needed for RF/Baseband switching/retuning by the UE's LP-WUR 621.

According to some aspects, the time domain gap 633 can be uniform (e.g., the same) for adjacent hops. Alternatively, the time domain gap 633 can be non-uniform for adjacent hops. According to some aspects, the duration of the time domain gap 633 can be UE specific. For example, different UEs can have different duration for their time domain gap 633. In some examples, the duration of the time domain gap 633 can be the same for some or for all the UEs.

FIG. 7 illustrates an example method 700 for a system (for example, a UE) performing mechanisms for improving receiver sensitivity loss for the LP-WUR, according to some aspects of the disclosure. As a convenience and not a limitation, FIG. 7 may be described with regard to elements of FIGS. 1-6. Method 700 may represent the operation of an electronic device (for example, UE 103 of FIG. 1 and/or UE 603 of FIG. 6A) implementing mechanisms for improving receiver sensitivity loss for the LP-WUR. Method 700 may also be performed by system 200 of FIG. 2 and/or computer system 900 of FIG. 9. But method 700 is not limited to the specific aspects depicted in those figures and other systems may be used to perform the method as will be understood by those skilled in the art. It is to be appreciated that not all operations may be needed, and the operations may not be performed in the same order as shown in FIG. 7.

At 702, a low-power wake-up signal (LP-WUS) or a LP-WUS part is received. For example, the UE (e.g., the UE 103 of FIG. 1 and/or the UE 603 of FIG. 6A) receives the LP-WUS and/or the LP-WUS part using the UE's low-power receiver (e.g., UE's LP-WUR). The UE can receive the LP-WUS from a base station (e.g., the base station 101 of FIG. 1 and/or the base station 601 of FIG. 6A).

According to some aspects, the LP-WUS (and/or the LP-WUS part) can be the LP-WUS (and/or the LP-WUS part) discussed with respect to FIGS. 1-6. For example, one or more of the time domain coverage improvement, power domain coverage improvement, spatial domain coverage improvement, and/or frequency domain coverage improvement have been applied to the LP-WUS (and/or the LP-WUS part). Although FIG. 7 is discussed with respect to LP-WUS, method 700 can also be applied to any LP-WUS part(s) of the LP-WUS.

According to some aspects, and as discussed with respect to FIGS. 4A-4E, the time domain coverage improvement has been applied to the LP-WUS. For example, the LP-WUS can include a plurality of symbols aggregated in the time domain and the plurality of symbols include one symbol that is repeated (e.g., two or more times) in the time domain. In some aspects, the plurality of symbols can be aggregated in the time domain with their corresponding cyclic prefix. In some aspects, the plurality of symbols can be aggregated in the time domain without their corresponding cyclic prefix. In some aspects, the plurality of symbols include a plurality of OFDM symbols with a subcarrier spacing (SCS) smaller than 15 kHz, for example, 1.25 kHz, 5 kHz, 15/32 kHz. In some aspects, the plurality of symbols are different from OFDM symbols (e.g., the plurality of symbols are not based on OFDM).

According to some aspects, and as discussed above, the power domain coverage improvement has been applied to the LP-WUS. In some aspects, method 700 can include transmitting, using the main transceiver of the UE, a message to the base station indicating a desired transmission power boost for the LP-WUS. The base station can use the received desired transmission power boost for transmitting future LP-WUS. For example, method 700 can further include receiving, using the low-power receiver (e.g., LP-WUR), a second LP-WUS from the base station where the second LP-WUS has an increased transmission power relative to that of the LP-WUS and based on the desired transmission power boost.

In some aspects, the desired transmission power boost can be one or more of an absolute transmission power value, an absolute transmission power offset value, an absolute transmission power adjustment, or an accumulative transmission power adjustment.

In some aspects, the desired transmission power boost for the LP-WUS is indicated indirectly using an uplink (UL) transmission power control. For example, method 700 can include receiving the uplink (UL) transmission power control for a UL transmission from the UE to the base station, where the UL transmission power control indicates a transmission power boost (e.g., a desired transmission power boost). The UL transmission power control can include a loss parameter associated with the transmission power boost According to some aspects, and as discussed above with respect to FIGS. 5A-5B, the spatial domain coverage improvement has been applied to the LP-WUS. For example, operation 702 can include receiving the LP-WUS using a plurality of spatial domain filters over a frequency domain resource or over a time domain resource. In some aspects, the plurality of spatial domain filters are explicitly configured by the base station or the plurality of spatial domain filters are implicitly configured by the base station.

According to some aspects, and as discussed above with respect to FIGS. 6A-6B, the frequency domain coverage improvement has been applied to the LP-WUS. For example, the UE can include a main transceiver that operates at a first frequency and a first bandwidth. The UE also includes the low-power receiver that operates at a second frequency and a second bandwidth. The second frequency can be different from the first frequency and the second bandwidth can be smaller (e.g., narrower) than the first bandwidth. In some aspects, operation 702 can include receiving the LP-WUS on the second frequency.

In some aspects, the second frequency is in a licensed band. In some aspects, the second frequency is in an unlicensed band. In some aspects, the second frequency is in a guard band associated with the first frequency and the first bandwidth.

In some aspects, method 700 can further include receiving, using the low-power receiver, a second LP-WUS, where the second LP-WUS is associated with a third frequency different from the first frequency and the second frequency. In some aspects, a time domain gap can exist between the LP-WUS and the second LP-WUS. The duration of the time domain gap can be set by the base station or can be reported by the UE to the base station.

At 704, it is determined whether the LP-WUS includes a downlink (DL) control channel monitoring indicator and/or whether the LP-WUS can be used for radio resource management (RRM) measurement. For example, the UE can determine whether the LP-WUS includes a downlink (DL) control channel monitoring indicator and/or whether the LP-WUS can be used for RRM measurement.

According to some aspects, the UE can determine whether the LP-WUS can be used for RRM measurement by determining that the LP-WUS includes an LP-WUS part for RRM measurement. Additionally, or alternatively, the UE can determine whether the LP-WUS can be used for RRM measurement by determining that the LP-WUS includes information for RRM measurement. Additionally, or alternatively, the UE can determine whether the LP-WUS can be used for RRM measurement by determining that the LP-WUS includes Reference Signal Received Power (RSRP). According to some aspects, the UE can determine whether the LP-WUS can be used for RRM measurement based on information provided in 3GPP standards specifications. According to some aspects, the UE can determine whether the LP-WUS can be used for RRM measurement based on configurations set by the network (e.g., by the base station using, for example, RRC signaling). According to some aspects, the UE can determine whether the LP-WUS can be used for RRM measurement based on the UE capability reported by the UE to the base station. However, other aspects of this disclosure can include other measurement information that can be used for mobility measurement and determination. The UE can use other methods determine whether the LP-WUS can be used for RRM measurement.

At 706, in response to the LP-WUS including the DL control channel monitoring indicator, the transceiver of the UE is triggered to transition to an awake state for monitoring the DL control channel. For example, the UE (e.g., using its low-power receiver) can trigger its main transceiver to transition to the awake state for monitoring the DL control channel.

At 708, in response to determining that the LP-WUS can be used for RRM measurement, the RRM measurement is performed based on the LP-WUS. For example, the UE can use the LP-WUS to perform RRM measurement.

FIG. 8 illustrates an example method 800 for a system (for example, a base station) performing mechanisms for improving receiver sensitivity loss for the LP-WUR, according to some aspects of the disclosure. As a convenience and not a limitation, FIG. 8 may be described with regard to elements of FIGS. 1-6. Method 800 may represent the operation of an electronic device (for example, the base station 101 of FIG. 1 and/or the base station 601 of FIG. 6A) implementing mechanisms for improving receiver sensitivity loss for the LP-WUR. Method 800 may also be performed by system 200 of FIG. 2 and/or computer system 900 of FIG. 9. But method 800 is not limited to the specific aspects depicted in those figures and other systems may be used to perform the method as will be understood by those skilled in the art. It is to be appreciated that not all operations may be needed, and the operations may not be performed in the same order as shown in FIG. 8.

At 802, one or more parameters for a low-power wake-up signal (LP-WUS) and/or LP-WUS part are determined. For example, the base station can determine the one or more parameters for the LP-WUS and/or for the LP-WUS part.

According to some aspects, the LP-WUS (and/or the LP-WUS part) can be the LP-WUS (and/or the LP-WUS part) discussed with respect to FIGS. 1-7. For example, the one or more parameters for the LP-WUS (and/or for the LP-WUS part) are determined for applying one or more of the time domain coverage improvement, power domain coverage improvement, spatial domain coverage improvement, and/or frequency domain coverage improvement to the LP-WUS. Although FIG. 8 is discussed with respect to LP-WUS, method 800 can also be applied to any LP-WUS part(s) of the LP-WUS.

According to some aspects, and as discussed with respect to FIGS. 4A-4E, the one or more parameters for the LP-WUS are determined to apply the time domain coverage improvement to the LP-WUS. For example, the LP-WUS can include a plurality of symbols aggregated in the time domain and the plurality of symbols include one symbol that is repeated (e.g., two or more times) in the time domain. In these examples, the one or more parameters for the LP-WUS can include number of symbols aggregated, the SCS of the symbols, whether cyclic prefix is used or not, whether a time domain gap is applied or not, or the like as discussed in this disclosure. In some aspects, the plurality of symbols can be aggregated in the time domain with their corresponding cyclic prefix. In some aspects, the plurality of symbols can be aggregated in the time domain without their corresponding cyclic prefix. In some aspects, the plurality of symbols include a plurality of OFDM symbols with a subcarrier spacing (SCS) of less than 15 kHz, for example, 1.25 kHz, 5 kHz, 15/32 kHz. In some aspects, the plurality of symbols are different from OFDM symbols (e.g., the plurality of symbols are not based on OFDM).

According to some aspects, and as discussed above, the one or more parameters for the LP-WUS are determined to apply the power domain coverage improvement to the LP-WUS. The one or more parameters for the LP-WUS can include a desired transmission power boost for the LP-WUS. The one or more parameters for the LP-WUS can also include one or more parameters for an UL transmission power control. The one or more parameters for the LP-WUS can also include a loss parameter associated with the desired transmission power boost. The one or more parameters for the LP-WUS can also include one or more of an absolute transmission power value, an absolute transmission power offset value, an absolute transmission power adjustment, or an accumulative transmission power adjustment.

In some aspects, method 800 can include receiving a message from the UE indicating the desired transmission power boost for the LP-WUS. The base station can use the received desired transmission power boost for transmitting future LP-WUS. For example, method 800 can further include increasing a transmission power of a second LP-WUS based on the desired transmission power boost and transmitting the second LP-WUS to the UE.

According to some aspects, and as discussed above with respect to FIGS. 5A-5B, the one or more parameters for the LP-WUS are determined to apply the spatial domain coverage improvement to the LP-WUS. The one or more parameters for the LP-WUS can include information associated with one or more spatial domain filters over a frequency domain resource or over a time domain resource. The one or more parameters for the LP-WUS can also include a number of PRB, a frequency hop, a number of slots, a number of milliseconds (ms), or the like for the spatial domain coverage improvement.

According to some aspects, and as discussed above with respect to FIGS. 6A-6B, the one or more parameters for the LP-WUS are determined to apply the frequency domain coverage improvement to the LP-WUS. The one or more parameters for the LP-WUS can include operation frequency and bandwidth for a main transceiver of the UE. The one or more parameters for the LP-WUS can also include operation frequency and bandwidth for the low-power receiver of the UE. The one or more parameters for the LP-WUS can also include whether to use a time domain gap and information associated with the time domain gap (e.g., a duration of the time domain gap, whether the time domain gaps are uniform or not, and the like). The one or more parameters for the LP-WUS can also include whether frequency hopping is performed by the base station for transmitting the LP-WUS and if so, the information associated with the frequency hopping.

After determining the one or more parameters for the LP-WUS, at 804, the LP-WUS is transmitted to the UE based on the determined one or more parameters for the LP-WUS. According to some aspects, the base station transmits the LP-WUS to the low-power receiver of the UE.

In some aspects, operation 804 can include transmitting the LP-WUS using a plurality of spatial domain filters over a frequency domain resource or over a time domain resource. In some aspects, the plurality of spatial domain filters are explicitly configured by the base station or the plurality of spatial domain filters are implicitly configured by the base station.

In some aspects, method 800 can further include transmitting multiple LP-WUS using different frequencies to apply the frequency hopping for the frequency domain coverage improvement.

At 806, a signal is transmitted on a DL control channel. Operation 806 can be an optional operation performed when the LP-WUS includes a DL control channel monitoring indicator. In some aspects, the base station can transmit the signal on the DL control channel where a main transceiver of the UE is monitoring the DL control channel.

Figure 9:
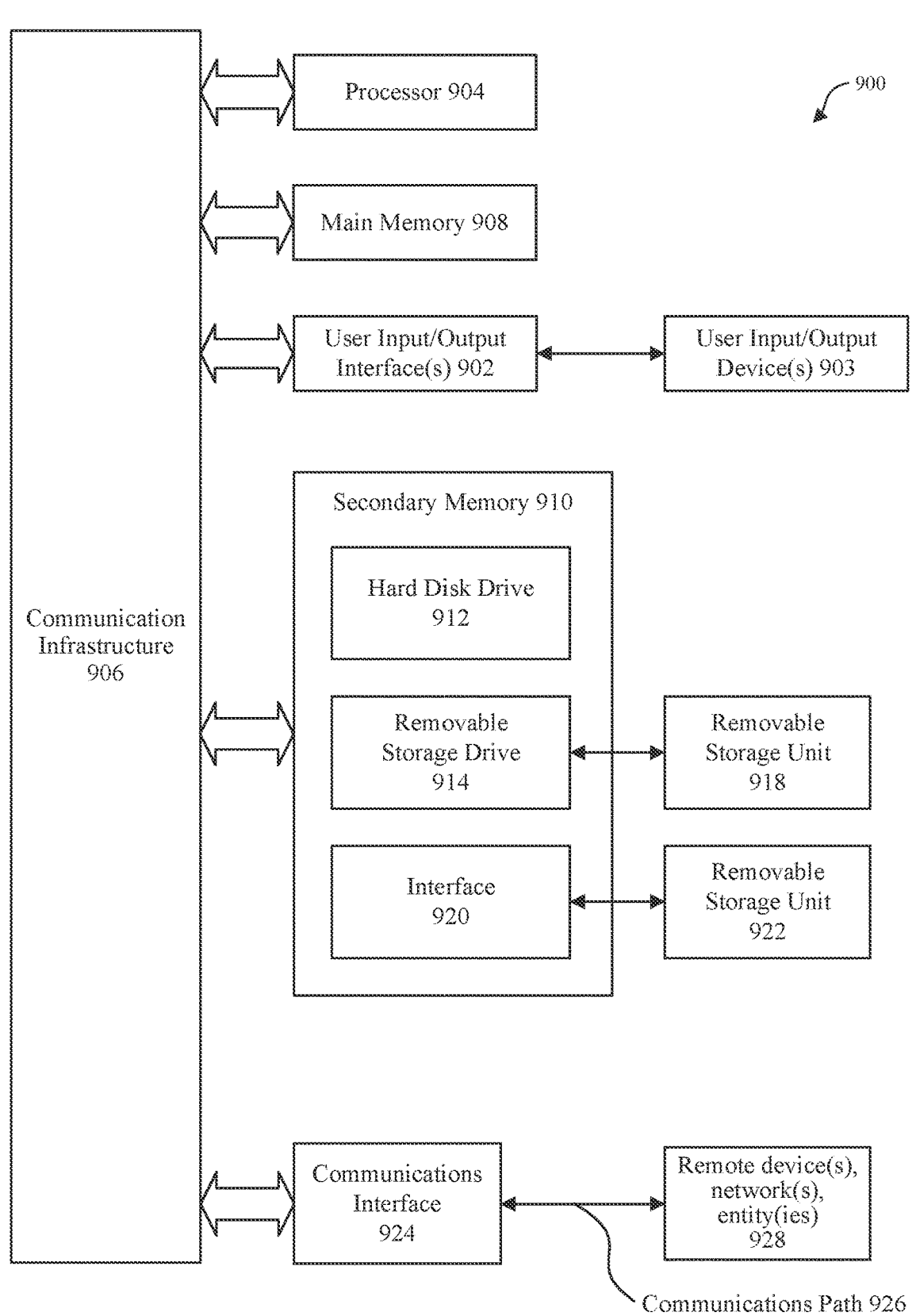
FIG. 9 is an example computer system for implementing some aspects or portion(s) thereof.

Various aspects can be implemented, for example, using one or more computer systems, such as computer system 900 shown in FIG. 9. Computer system 900 can be any well-known computer capable of performing the functions described herein such as devices 101, 103 of FIG. 1, 200 of FIG. 2, and/or 601, 603 of FIG. 6A. Computer system 900 includes one or more processors (also called central processing units, or CPUs), such as a processor 904. Processor 904 is connected to a communication infrastructure 906 (e.g., a bus). Computer system 900 also includes user input/output device(s) 903, such as monitors, keyboards, pointing devices, etc., that communicate with communication infrastructure 906 through user input/output interface(s) 902. Computer system 900 also includes a main or primary memory 908, such as random access memory (RAM). Main memory 908 may include one or more levels of cache. Main memory 908 has stored therein control logic (e.g., computer software) and/or data.

Computer system 900 may also include one or more secondary storage devices or memory 910. Secondary memory 910 may include, for example, a hard disk drive 912 and/or a removable storage device or drive 914. Removable storage drive 914 may be a floppy disk drive, a magnetic tape drive, a compact disk drive, an optical storage device, tape backup device, and/or any other storage device/drive.

Removable storage drive 914 may interact with a removable storage unit 918. Removable storage unit 918 includes a computer usable or readable storage device having stored thereon computer software (control logic) and/or data. Removable storage unit 918 may be a floppy disk, magnetic tape, compact disk, DVD, optical storage disk, and/any other computer data storage device. Removable storage drive 914 reads from and/or writes to removable storage unit 918 in a well-known manner.

According to some aspects, secondary memory 910 may include other means, instrumentalities or other approaches for allowing computer programs and/or other instructions and/or data to be accessed by computer system 900. Such means, instrumentalities or other approaches may include, for example, a removable storage unit 922 and an interface 920. Examples of the removable storage unit 922 and the interface 920 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 900 may further include a communication or network interface 924. Communication interface 924 enables computer system 900 to communicate and interact with any combination of remote devices, remote networks, remote entities, etc. (individually and collectively referenced by reference number 928). For example, communication interface 924 may allow computer system 900 to communicate with remote devices 928 over communications path 926, which may be wired and/or wireless, and which may include any combination of LANs, WANs, the Internet, etc. Control logic and/or data may be transmitted to and from computer system 900 via communication path 926.

The operations in the preceding aspects can be implemented in a wide variety of configurations and architectures. Therefore, some or all of the operations in the preceding aspects may be performed in hardware, in software or both. In some aspects, a tangible, non-transitory apparatus or article of manufacture includes a tangible, non-transitory computer uscable or readable medium having control logic (software) stored thereon is also referred to herein as a computer program product or program storage device. This includes, but is not limited to, computer system 900, main memory 908, secondary memory 910 and removable storage units 918 and 922, as well as tangible articles of manufacture embodying any combination of the foregoing. Such control logic, when executed by one or more data processing devices (such as computer system 900), causes such data processing devices to operate as described herein.

Based on the teachings contained in this disclosure, it will be apparent to persons skilled in the relevant art(s) how to make and use aspects of the disclosure using data processing devices, computer systems and/or computer architectures other than that shown in FIG. 9. In particular, aspects may operate with software, hardware, and/or operating system implementations other than those described herein.

It is to be appreciated that the Detailed Description section, and not the Summary and Abstract sections, is intended to be used to interpret the claims. The Summary and Abstract sections may set forth one or more, but not all, exemplary aspects of the disclosure as contemplated by the inventor(s), and thus, are not intended to limit the disclosure or the appended claims in any way.

While the disclosure has been described herein with reference to exemplary aspects for exemplary fields and applications, it should be understood that the disclosure is not limited thereto. Other aspects and modifications thereto are possible, and are within the scope and spirit of the disclosure. For example, and without limiting the generality of this paragraph, aspects are not limited to the software, hardware, firmware, and/or entities illustrated in the figures and/or described herein. Further, aspects (whether or not explicitly described herein) have significant utility to fields and applications beyond the examples described herein.

Aspects have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. In addition, alternative aspects may perform functional blocks, steps, operations, methods, etc. using orderings different from those described herein.

References herein to "one aspect," "aspects" "an example," "examples," or similar phrases, indicate that the aspect(s) described may include a particular feature, structure, or characteristic, but every aspect may not necessarily include the particular feature, structure, or characteristic. Moreover, such phrases are not necessarily referring to the same aspect. Further, when a particular feature, structure, or characteristic is described in connection with an aspect, it would be within the knowledge of persons skilled in the relevant art(s) to incorporate such feature, structure, or characteristic into other aspects whether or not explicitly mentioned or described herein.

The breadth and scope of the disclosure should not be limited by any of the above-described exemplary aspects, but should be defined only in accordance with the following claims and their equivalents.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be casily accessible by users, and should be updated as the collection and/or use of data changes. Personal information from users should be collected for legitimate and reasonable uses of the entity and not shared or sold outside of those legitimate uses. Further, such collection/sharing should only occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of, or access to, certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

What is claimed is:

1. A user equipment (UE), comprising:
   a transceiver configured to wirelessly communicate with a base station;
   a low-power receiver configured to wirelessly communicate with the base station; and
   a processor communicatively coupled to the transceiver and the low-power receiver, and configured to:
      receive, using the low-power receiver, a low-power wake-up signal (LP-WUS), wherein the LP-WUS comprises a plurality of symbols aggregated in a time domain and wherein the plurality of symbols comprise one symbol repeated in the time domain;
      determine whether the LP-WUS comprises a downlink (DL) control channel monitoring indicator; and
      in response to the LP-WUS comprising the DL control channel monitoring indicator, trigger the transceiver to transition to an awake state to monitor a DL control channel.

2. The UE of claim 1, wherein the plurality of symbols are aggregated in the time domain with their corresponding cyclic prefix.

3. The UE of claim 1, wherein the plurality of symbols are aggregated in the time domain without their corresponding cyclic prefix.

4. The UE of claim 1, wherein the plurality of symbols comprise a plurality of orthogonal frequency-division multiplexing (OFDM) symbols with a subcarrier spacing (SCS) smaller than 15 kHz.

5. The UE of claim 1, wherein the processor is further configured to:
   use the LP-WUS for radio resource management (RRM) measurement; and
   perform the RRM measurement based on the LP-WUS.

6. The UE of claim 1, wherein the processor is further configured to:
   transmit, using the transceiver, a message to the base station indicating a desired transmission power boost for the LP-WUS; and
   receive, using the low-power receiver, a second LP-WUS from the base station, the second LP-WUS having an increased transmission power relative to that of the LP-WUS and based on the desired transmission power boost for the LP-WUS.

7. The UE of claim 6, wherein the desired transmission power boost comprises:
   an absolute transmission power value,
   an absolute transmission power offset value,
   an absolute transmission power adjustment, or
   an accumulative transmission power adjustment.

8. The UE of claim 1, wherein the processor is further configured to receive an uplink (UL) transmission power control for a UL transmission from the UE to the base station, wherein the UL transmission power control indicates a transmission power boost.

9. The UE of claim 8, wherein the UL transmission power control is based on a loss parameter associated with the transmission power boost.

10. The UE of claim 1, wherein the processor is configured to receive the LP-WUS using a plurality of spatial domain filters over a frequency domain resource or over a time domain resource.

11. The UE of claim 1, wherein the plurality of spatial domain filters are explicitly configured by the base station or the plurality of spatial domain filters are implicitly configured by the base station.

12. A method performed by a user equipment (UE), the method comprising:
   receiving, using a low-power receiver of the UE, a low-power wake-up signal (LP-WUS) from a base station, wherein the LP-WUS comprises a plurality of symbols aggregated in a time domain and wherein the plurality of symbols comprise one symbol repeated in the time domain;
   determining whether the LP-WUS comprises a downlink (DL) control channel monitoring indicator; and
   in response to the LP-WUS comprising the DL control channel monitoring indicator, triggering a transceiver of the UE to transition to an awake state to monitor a DL control channel.

13. The method of claim 12, wherein the plurality of symbols are aggregated in the time domain with their corresponding cyclic prefix.

14. The method of claim 12, wherein the plurality of symbols are aggregated in the time domain without their corresponding cyclic prefix.

15. The method of claim 12, wherein the plurality of symbols comprise a plurality of orthogonal frequency-division multiplexing (OFDM) symbols with a subcarrier spacing (SCS) smaller than 15 kHz.

16. The method of claim 12, further comprising:
   performing RRM measurement based on the LP-WUS.

17. A non-transitory computer-readable medium storing instructions that when executed by a processor of a user equipment (UE) cause the UE to perform operations comprising:
   receiving, using a low-power receiver of the UE, a low-power wake-up signal (LP-WUS) from a base station, wherein the LP-WUS comprises a plurality of symbols aggregated in a time domain and wherein the plurality of symbols comprise one symbol repeated in the time domain;
   determining whether the LP-WUS comprises a downlink (DL) control channel monitoring indicator; and
   in response to the LP-WUS comprising the DL control channel monitoring indicator, triggering a transceiver of the UE to transition to an awake state to monitor a DL control channel.

18. The non-transitory computer-readable medium of claim 17, wherein the operations further comprising:
   performing RRM measurement based on the LP-WUS.

19. The non-transitory computer-readable medium of claim 17, wherein the operations further comprising:
   transmitting, using the transceiver, a message to the base station indicating a desired transmission power boost for the LP-WUS; and
   receiving, using the low-power receiver, a second LP-WUS from the base station, the second LP-WUS having an increased transmission power relative to that of the LP-WUS and based on the desired transmission power boost for the LP-WUS.

20. The non-transitory computer-readable medium of claim 17, wherein the operations further comprising receiving an uplink (UL) transmission power control for a UL transmission from the UE to the base station, wherein the UL transmission power control indicates a transmission power boost.

* * * * *